(12) United States Patent
Sontti et al.

(10) Patent No.: US 7,641,850 B2
(45) Date of Patent: Jan. 5, 2010

(54) METHOD AND APPARATUS FOR STRENGTHENING OF POWDER METAL GEARS BY AUSFORMING

(75) Inventors: Nagesh Sontti, State College, PA (US); Maurice F. Amateau, State College, PA (US); Suren B. Rao, Boalsburg, PA (US)

(73) Assignee: The Penn State Research Foundation, University Park, PA (US)

( * ) Notice: Subject to any disclaimer, the term of this patent is extended or adjusted under 35 U.S.C. 154(b) by 311 days.

(21) Appl. No.: 10/802,141

(22) Filed: Mar. 17, 2004

(65) Prior Publication Data
US 2004/0219051 A1 Nov. 4, 2004

Related U.S. Application Data

(60) Provisional application No. 60/455,997, filed on Mar. 18, 2003.

(51) Int. Cl.
*B22F 3/24* (2006.01)
(52) U.S. Cl. .............................. 419/28; 419/31; 419/38; 419/43; 148/573; 148/586; 74/434
(58) Field of Classification Search .................... 419/28
See application file for complete search history.

(56) References Cited

U.S. PATENT DOCUMENTS

| | | | | |
|---|---|---|---|---|
| 4,972,735 A | * | 11/1990 | Torii et al. ................ | 74/665 M |
| 5,221,513 A | | 6/1993 | Amateau et al. .............. | 266/81 |
| 5,391,862 A | | 2/1995 | Amateau et al. ............ | 219/667 |
| 5,451,275 A | | 9/1995 | Amateau et al. ............ | 148/573 |
| 5,656,106 A | | 8/1997 | Amateau et al. ............ | 148/586 |
| 5,711,187 A | | 1/1998 | Cole et al. ..................... | 74/434 |
| 5,799,398 A | | 9/1998 | Amateau et al. ......... | 29/893.32 |
| 6,007,762 A | | 12/1999 | Amateau et al. ............ | 266/118 |
| 6,126,892 A | | 10/2000 | Amateau et al. ............ | 266/118 |
| 6,264,768 B1 | | 7/2001 | Sonti et al. .................. | 148/567 |
| 6,729,171 B2 | * | 5/2004 | Ladousse et al. .............. | 72/108 |

(Continued)

OTHER PUBLICATIONS

Puskar, et al., "Microstructure and Mechanical Response of Ausformed Steel Surfaces", Advances in Powder Metallurgy and Particulate Materials, 1996, vol. 4, part 13, pp. 491-500.

(Continued)

*Primary Examiner*—Roy King
*Assistant Examiner*—Christopher Kessler
(74) *Attorney, Agent, or Firm*—Perman & Green, LLP

(57) ABSTRACT

A technique for net shaping gear teeth of a high performance power transmission gear from a powder metal workpiece includes heating a powder metal workpiece in the form of a near net shaped gear blank having gear teeth surfaces above its critical temperature to obtain an austenitic structure throughout its surfaces, isothermally quenching the workpiece at a rate greater than the critical cooling rate of its surfaces to a uniform metastable austenitic temperature just above the martensitic transformation temperature, rolling the gear teeth surfaces of the workpiece to a desired outer peripheral profiled shape between opposed dies, each die having an outer peripheral profiled surface, while holding the workpiece at the uniform metastable austenitic temperature, the gear teeth surfaces undergoing densification, plastic deformation, and strengthening as a result of the rolling operation, and cooling the workpiece through the martensitic range to thereby harden the surfaces of the gear teeth.

24 Claims, 15 Drawing Sheets

U.S. PATENT DOCUMENTS 6,779,270 B2 * 8/2004 Sonti et al. ............... 29/893.32

OTHER PUBLICATIONS

Sonti, et al., "A Case Study of an Ausformed Helical Pinion Gear", Advances in Powder Metallurgy and Particulate Materials, 1996, vol. 4, part 13, pp. 451-461.

Queeney, et al., "Mechanical response of Surface-Ausrolled Sintered Steel", Advances in Powder Metallurgy, 1991, vol. 3, pp. 159-170.

Kuplen, et al., "Ausrolling Sintered Steels for Bearing Elements", Advances in Powder Metallurgy and Particulate Materials, 1992, vol. 2, pp. 355-363.

* cited by examiner

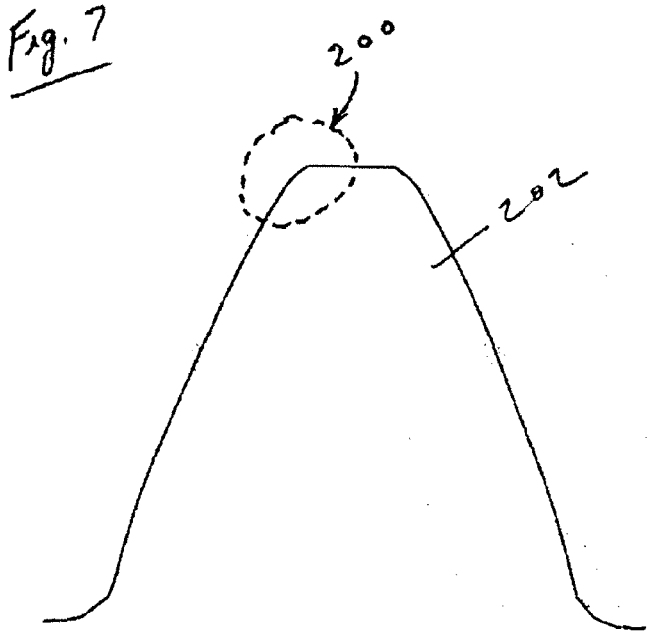
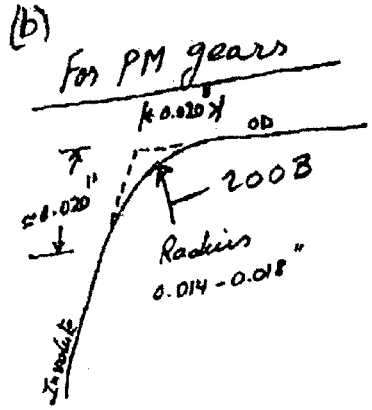
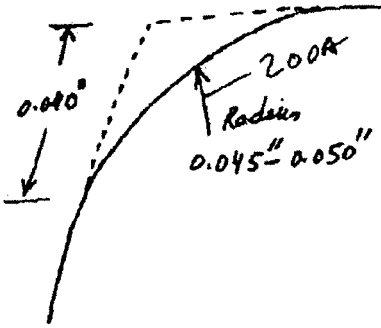
Fig. 7

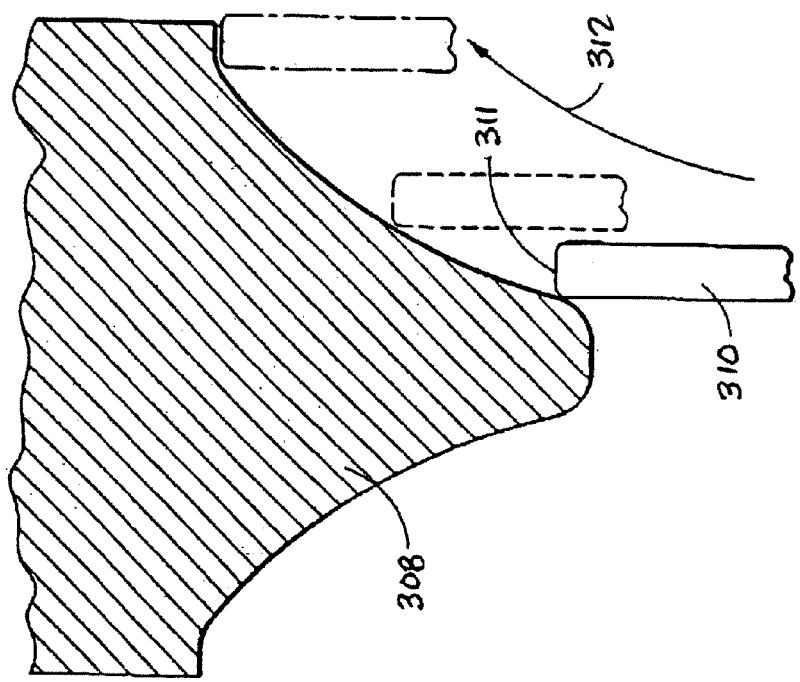

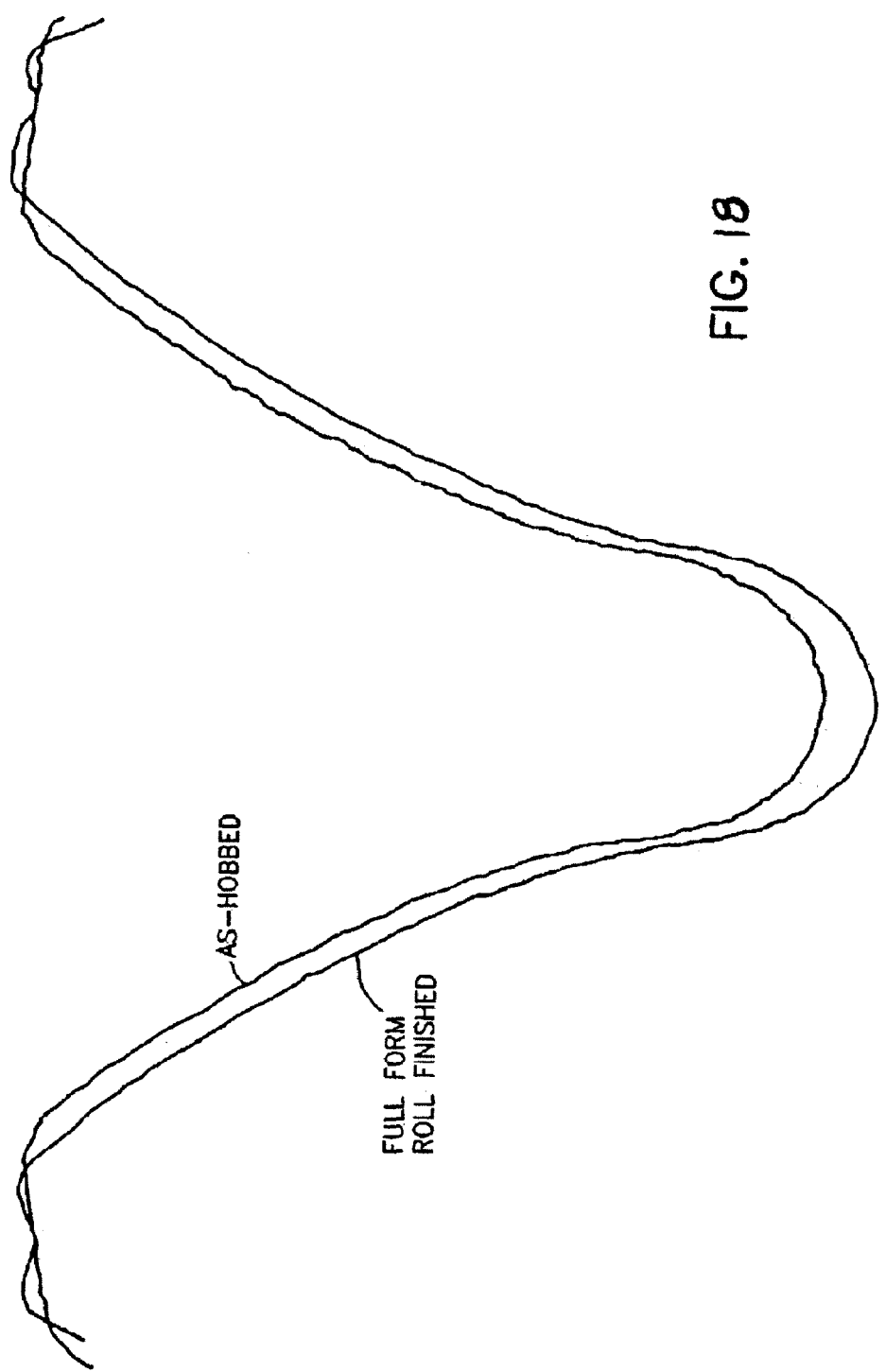

METHOD AND APPARATUS FOR STRENGTHENING OF POWDER METAL GEARS BY AUSFORMING

INCORPORATION BY REFERENCE

The present application is related to Provisional Application Ser. No. 60/455,997 of Nagesh Sonti et al., filed Mar. 18, 2003, entitled "Method and Apparatus for Strengthening of Powder Metal Gears by Ausforming", based on which priority is herewith claimed under 35 U.S.C. §119(e) and the disclosure of which is incorporated herein by reference in its entirety. Additionally, the provisions of U.S. Pat. Nos. 5,451,275, 5,221,513; 5,391,862; 5,451,275; 5,656,106; 5,799,398; 6,007,762; 6,126,892, all to Amateau et al., and U.S. Pat. No. 6,264,768 and U.S. patent application Ser. No. 10/056,928, both to Sonti et al., are all hereby incorporated into the present application by reference.

BACKGROUND OF THE INVENTION

1. Field of the Invention

The present invention relates to apparatus and methods for thermomechanically treating sintered and heat treated powder metal steel gears in the metastable austenitic condition to produce increased surface densification and plastic deformation of the load bearing surfaces and, thereby, higher strength and accurate contact surfaces through a net shape finishing process. The invention particularly relates to an apparatus and method for increasing the bending strength and surface durability of powder metal gears by ausforming the tooth surface and sub-surface layers of gears including spur, helical and intersecting axis type gears. Applications for ausformed powder metal gears include automotive power transmissions in the operation of which the gears are subjected to high loads and speeds.

2. Description of the Prior Art

The sintered powder metal process is making inroads in many vehicle applications because of the substantially lower costs of powder metal steel components for high volume production. However, because of current strength limitations of powder metal components, applications in vehicle power transmissions have been limited only to lower-loaded components. Although powder metal gears are increasingly being used in powered hand tools, gear pumps, and as accessory components in automotive transmissions, powder metal gears have not been used for power transmission gearing. The state-of-the-art powder metal gears do not possess adequate tooth bending strength and pitting/wear resistance as compared to gears produced from wrought and/or forged steels.

Highly loaded gears used for power transmission gearing are conventionally manufactured from wrought and/or forged low carbon, low to medium alloyed steel blanks. After preliminary blank machining, gear teeth are produced by metal cutting operations such as hobbing or shaping, or by forging to near net shape. Gears are then heat treated to impart desired surface strength, strength gradient and core toughness. Heat treatment involves carburizing the surface of low carbon steel gears to increase the surface and near surface carbon content, followed by hardening by rapid quenching to below the temperature at which a diffusionless transformation process that creates a hardened martensitic structure proceeds to completion, the so-called $M_s$ temperature. Alternatively, gear wheels produced from medium to high carbon alloy steel compositions, which therefore do not need carburization, are instead induction hardened, wherein only the gear tooth surfaces are heated and then quenched to produce the hardened martensitic structure. The hardened gears are then finished to net shape by grinding, skiving, burnishing, and/or honing operations.

For powder metal gears, a method has been described in U.S. Pat. No. 5,711,187, wherein a powder metal gear wheel formed from a pressed and sintered powder metal blank is claimed to be surface hardened by densifying the tooth surface layers, both in the flank and root/fillet region. The '187 patent describes a pre-finishing technique of gear rolling that is performed prior to heat treatment and hardening using either a single-die or double-die rolling apparatus, and is applicable for sintered low alloy steel compositions similar to SAE 4100, SAE 4600, and SAE 8600 grades. However, as the method described in the '187 patent is a pre-finishing operation that is performed prior to heat treatment and hardening, it is applicable only to low carbon low alloy sintered steel compositions in the soft machinable condition, particularly compositions with carbon contents of 0.2% or less. The '187 patent claims full theoretical densification at the rolled surfaces and a progressively decreasing densification (90-100%) gradient of at least 380 microns up to about 1000 microns in depth.

As noted above, the method described in the '187 patent is applicable only to relatively soft gear wheel blanks made of low carbon low alloy sintered powder metal steel compositions with hardness typically less than BHN 180 (or HRC less than 24). Gear rolling of soft sintered gear tooth surfaces as described in '187 produces densification of tooth surface layers. As has been noted above, powder metal gears, either in the as-sintered condition or after surface densification by gear rolling as described in the '187 patent, have to be heat treated by carburizing and hardening operations to achieve the specific surface hardness, hardness gradient and core strength necessary for high load bearing power transmission gearing. Any surface hardening achieved due to work hardening by gear rolling and related surface densification as described in '187 is substantially eliminated during the subsequent heat treatment process.

Furthermore, because the sintered and densified powder metal gears produced by the method described in '187 are subjected to heat treatment and hardening, the gears may require subsequent hard finishing by grinding, skiving, burnishing or honing operations to achieve the required level of accuracy, resulting in removal of about 150 microns of the densified surface region of gear teeth. This removal of the portion of the surface region with improved apparent hardness of powder metal densified surface layers lowers the load bearing capacity.

Apparatus and methods have been described in U.S. Pat. Nos. 5,221,513; 5,391,862; 5,451,275; 5,656,106; 5,799,398; 6,007,762; 6,126,892 for wrought and/or forged steel gear wheels and U.S. Pat. No. 6,264,768 for rolling element bearings in which a carburized and hardened workpiece is finished by thermomechanical means by inducing controlled plastic deformation in the metastable austenitic condition via gear rolling. Such a thermomechanical treatment, also called ausform finishing, of hardened gear tooth surfaces involves reaustenitization by induction heating followed by marquenching at about 450-500° F. or above the start of the martensite transformation temperature, the so-called $M_s$ temperature. The gear teeth in this marquenched condition are roll finished and then finally quenched to martensite before any diffusional decomposition can form from the metastable austenite. For wrought and/or forged gear wheels, the thermomechanical method of ausform finishing described in the above-identified patents results in substantial material flow up and down the tooth surfaces and in the axial direction due to combined rolling and sliding action on the tooth surfaces.

Unlike conventional gear finishing such as grinding, the outermost surface hardened layers are not removed during the ausform finishing operation.

The method described in the previously mentioned patents is also applicable to medium to high carbon alloyed gear steels, wherein the carbon content is sufficiently high such that the carburizing operation is not required. The thermomechanical procedure described in the patents is thus applicable to both low carbon carburized/hardened gear steels as well as medium to high carbon induction hardenable gear steels and is employed in the present invention.

SUMMARY OF THE INVENTION

According to the invention, a technique for net shaping gear teeth of a high performance power transmission gear from a powder metal workpiece includes heating a powder metal workpiece in the form of a near net shaped gear blank having gear teeth surfaces above its critical temperature to obtain an austenitic structure throughout its surfaces, isothermally quenching the workpiece at a rate greater than the critical cooling rate of its surfaces to a uniform metastable austenitic temperature just above the martensitic transformation temperature, rolling the gear teeth surfaces of the workpiece to a desired outer peripheral profiled shape between opposed dies, each die having an outer peripheral profiled surface, while holding the workpiece at the uniform metastable austenitic temperature, the gear teeth surfaces undergoing densification, plastic deformation, and strengthening as a result of the rolling operation, and cooling the workpiece through the martensitic range to thereby harden the surfaces of the gear teeth.

A primary feature, then, of the present invention is the provision of apparatus and methods for thermomechanically treating sintered and heat treated powder metal steel gears in the metastable austenitic condition to produce increased surface densification and plastic deformation of the load bearing surfaces, and thereby higher strength and accurate contact surfaces through a net shape finishing process.

Another feature of the present invention is the provision of an apparatus and method for increasing the bending strength and surface durability of powder metal gears by ausforming the tooth surface and sub-surface layers of gears including spur, helical and intersecting axis type gears, where the intersecting axis type gears include at least one of a bevel gear including straight bevel gears and spiral bevel gears, a hypoid gear, a worm gear, and a worm-wheel gear.

Still another feature of the present invention is the provision of applications for ausformed powder metal gears which include automotive power transmissions in the operation of which the gears are subjected to high loads and speeds.

A further feature of the present invention is the provision of such a technique for the fabrication of gears from powder metal near net shape workpieces according to which opposed dies, each having an outer peripheral profiled surface, for rolling the gear teeth surfaces to a desired outer peripheral profiled shape while holding the temperature of the workpiece in the uniform metastable austenitic temperature range, are operable such that the workpiece gear surfaces first undergo densification by rolling involving substantial compaction of the material in the gear tooth surface layers resulting in a collapse of the pores initially existing near the gear tooth surface region, then plastic deformation as a result of the rolling in the metastable austenitic temperature range with resultant strengthening of the gear teeth.

Yet another feature of the present invention is the provision of a technique for precision form finishing of the entire contour of a machine element composed of powder metal, typically the teeth of gears, including the active contacting surfaces and the trochoidal root/fillet regions, thereby inducing material flow in the critical regions of the teeth.

Yet a further feature of the present invention is the provision of such a technique of full form finishing of powder metal steel gear workpieces by plastically deforming these regions which results in higher strength and accuracy of the teeth thereof.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

FIGS. 7, 7(a), and 7(b) are diagrammatic detail elevation views of a gear tooth die profile to depict differences between a die for forming a wrought steel gear and a die for forming a powder metal steel gear;

FIG. 17 is a diagrammatic detail cross section view illustrating the dressing of a grinding wheel to produce the designed conjugate rolling die tooth profile according to the invention; and FIG. 18 is a diagrammatic illustration presenting a comparison of gear tooth profiles, specifically an as-hobbed profile and a full form roll finished profile according to the invention.

DETAILED DESCRIPTION OF THE PREFERRED EMBODIMENTS

Figures 1, 5:
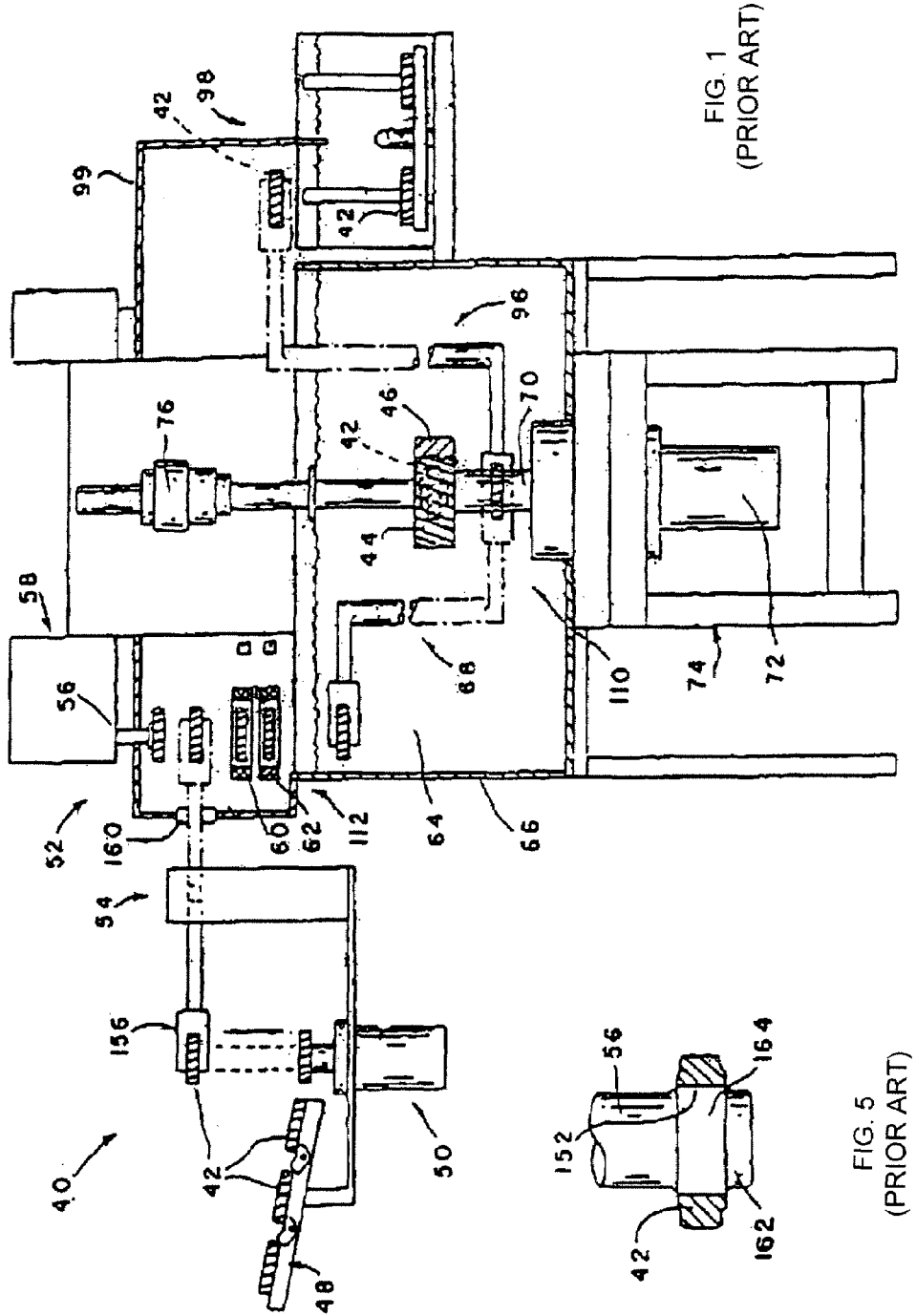
FIG. 1 is a side elevation view diagramatically illustrating known apparatus, which can be used in conjunction with the present invention, for performing precision gear finishing by controlled deformation.
FIG. 5 is a detail side elevation view, partly cut away and in section, of a component illustrated in FIG. 1.

Substantial research was carried out to develop thermomechanical means to integrate strengthening and roll finishing in sintered and hardened powder metal steel components. Cylindrical powder metal specimens with up to 15% porosity in the sintered and hardened conditions were surface densified by thermomechanical means to nearly theoretically full density at the surface, to less than 2% porosity at depths of 70-200 microns, and to about 4% porosity at depths of 250-1300 microns. Simultaneous densification and hardening was achieved for SAE 4680 and SAE 46100 powder metal alloy formulations with carbon contents of 0.8% and 1.0% respectively, with associated enhancements in particulate and apparent hardness and performance.

A study was also carried out to evaluate whether a powder metal gear could be ausformed without breaking off the teeth sequentially during the thermomechanical operation. Rather than starting with a near-net shaped sintered powder metal gear blank, a gear wheel with teeth was machined from cylindrical sintered powder metal blanks of SAE 4680 formulation in order to minimize costs. The study demonstrated the potential for thermomechanical means of rolling and densifying sintered and hardened powder metal gear blanks, but also showed the need for further developments in the specialized shape of the rolling dies required for rolling the sintered and hardened powder metal gear blanks by thermomechanical means to desired accuracy.

These studies have led to the present invention wherein sintered and hardened gear wheels are surface densified, hardened, strengthened and finished to high accuracy by thermomechanical means in the metastable austenitic condition. This simultaneously occurs in the gear tooth flanks and in the root/fillet regions by substantial surface compaction during the rolling operation.

In accordance with the present invention, there is provided a method and apparatus for densification by surface compaction and roll finishing of sintered and hardened powder metal gear wheels by thermomechanical means in the metastable austenitic condition, both on the flanks and in the root/fillet regions of gear teeth, resulting in surface densification to fully dense at the surface and 95-100% in the near surface region. This produces enhanced apparent surface and near surface hardness, improves mechanical properties due to ausforming, and produces a dimensional accuracy and surface finish comparable to or better than hard grinding, thereby eliminating the need for any subsequent finishing operations. The method described herein is applicable to both sintered low carbon alloy powder metal gear steels that are carburized and hardened prior to the thermomechanical finishing treatment, and to sintered medium to high carbon alloy powder metal gear steels that are induction hardenable. Henceforth, both types of these powder metal gear steels will be referred to as hardened powder metal gear steels.

The method of the present invention for sintered and hardened powder metal gears results in surface densification to 100% theoretical density at the surface, with progressively reducing densification of 95 to 100% produced at least in the outer 400 microns, and possibly up to 1300 microns. Furthermore, as the procedure of the present invention is the final finishing operation for hardened powder metal gears, the full benefit of the surface densification achieved and the related enhanced apparent surface hardness, finished gear strength, accuracy and surface finish, are fully retained. Finally, the plastic deformation induced in the metastable austenitic condition by thermomechanical means induces additional strength due to ausforming effects, thus resulting in further enhanced strength of the gear wheels.

As the powder metal sintered and heat treated gear wheels contain substantial amounts of pores prior to densification with effective density in the range of 90-95% of theoretically fully dense alloy, the rolling dies used for thermomechanical finishing are required to be designed specifically for densification by rolling involving substantial compaction of the material in the tooth surface layers. In contrast, the rolling dies for thermomechanical finishing of gear wheels made of wrought or forged steels are designed for combined rolling and sliding action on the tooth surface layers. The material flow is lateral oriented both in the tangential direction up and down the gear teeth as well as in the axial direction as no radial compaction of the material is possible. Therefore, for the thermomechanical finishing of powder metal sintered and heat treated gear wheels, the rolling dies apply surface densification pressure resulting in a collapse of the pores near the tooth surface region. This results in densification. The shape of the rolling die, especially the die tooth tips, are designed for conjugacy, for contacting the gear wheel in the regions of interest and for compressing the material.

In order to achieve a nominally involute rolled gear wheel tooth profile in the finished condition for sintered and hardened powder metal steel gears, the rolling dies' tooth profile must substantially deviate from nominal involute tooth geometry. As the method of the present invention involves induction heating of the gear tooth surfaces followed by marquenching to temperatures in the range of 450-500° F., and then plastic deformation and compaction of surface layers by gear rolling, the rolling dies are maintained at the processing temperature of 450-500° F. and therefore are subjected to substantial thermal expansion. Due to the rolling die thermal expansion, the die tooth profile at the elevated operating temperature is substantially different from the initial rolling die tooth profile at room temperature and as originally produced. Similarly, the gear is not only roll finished at the elevated temperature of 450-500° F., but is also subjected to localized heating of the surface layers by induction heating followed by marquenching.

The gear is thus subjected to a complex thermal history as well as associated metallurgical transformations. The resulting volumetric dimensional changes in the gear tooth profiles thus result in substantial deviation from the initial gear tooth profiles at room temperature and as originally produced. The gear teeth in the thermally and metallurgically modified geometrical shape and state are then rolled against the thermally modified rolling dies under high loads and speeds. The gear teeth are thus subjected to plastic deformation and densification at the elevated temperature by rolling pressure applied by the thermally modified rolling dies.

The roll finished and densified gear, still at the elevated temperature, is then finally quenched to room temperature and/or further below the $M_f$ temperature. It is in the finally quenched condition that the sintered, hardened and rolled/densified gear wheel is in conformance with the specified nominally involute gear geometry condition. Predicting and implementing the required initial specialized rolling die tooth profile is critical for achieving the desired contact along the gear wheel tooth surfaces and the desired degree of compaction and densification in the flank and root/fillet regions of the gear teeth.

More recently, in order to produce wrought or forged steel gears with improved accuracy, surface finish and enhanced load carrying capacity, it was recognized that the gear roll finishing process must be applied to both the active contacting surfaces as well as the trochoidal root fillet regions of the helical gear teeth, and apparatus and methods to this end have been disclosed in U.S. application Ser. No. 10/056,923 of Nagesh Sonti et al. As therein explained, if the roll finishing operation were extended to finish the root/fillet regions in addition to the active contacting surfaces of the gear teeth, then the surface finish and bending fatigue strength of the gear teeth would be substantially improved. Root fillet regions of gear teeth experience the maximum bending stress. Roll finishing of the root/fillet regions improves the surface finish, thereby reducing the stress concentration, and enhance the fatigue resistance of the material due to plastic working.

It was with knowledge of the foregoing state of the technology that the present invention has been conceived and is now reduced to practice.

Turn now to the drawings and initially to FIG. 1 which illustrates a preferred embodiment of a system 40, which can be applied according to the present invention for the fabrication of powder metal components, specifically, gears. The system is devised for precision gear finishing by controlled deformation using a fixed axis through-feed of a powder metal workpiece 42 and in-feed of two rolling gear dies 44, 46 on moving axes. This system has been disclosed in U.S. Pat. No. 5,451,275 to Amateau et al. with respect to wrought or forged steel gears. With continued reference to FIG. 1, a brief overview of the operation of system 40 will be provided, after which a more detailed description of the components of the system 40 will be related. The system 40 provides for the timely and automatic transfer of each workpiece 42 to a plurality of processing stations.

For purposes of the present disclosure, the workpiece 42 is referred to initially as a "near net shaped gear blank" and when all processes of the invention have been completed, it is referred to as a "net shaped gear". As a near net shaped gear blank, it may have been hobbed or otherwise formed using conventional techniques. As such, for purposes of the invention, the workpiece 42 is formed with its gear teeth approximately 0.001 to 0.002 inches oversized in tooth thickness relative to the final or desired size so that the gear can meet the dimensional tolerances of AGMA required for high performance gears without the necessity of grinding. The displacement of the metal during the deforming operations performed in accordance with the invention serves to remove the excess tooth thickness while assuring the proper profile. Grinding is eliminated, and for this reason alone, there can be as much as a 70% increase in surface durability at any given contact stress level.

Conventionally, high strength gears have generally been fabricated from a low carbon alloy carburizing grade steel in which the surface and sub-surface regions have been enriched with carbon to a specified depth. The higher carbon content serves to increase the hardness and to strengthen the material along the gear contacting teeth surfaces and beneath the surface. The elevation in hardness results from transformation of the steel from the face centered cubic crystal structure known as austenite to the body centered tetragonal crystal structure of very fine grain size known as martensite. Less hard but tougher properties can be obtained by isothermal transformation to bainite or a mixture of bainite and martensite upon quenching.

In a conventional gear processing method, the workpiece is quenched rapidly through the austenitic region by immersion into quenching media below the $M_s$ temperature. The workpiece is subsequently tempered at a designated temperature to soften the structure and impart ductility. After the tempering treatment is complete, gear finishing is accomplished by grinding in a well known manner for high performance gears.

Figure 2:
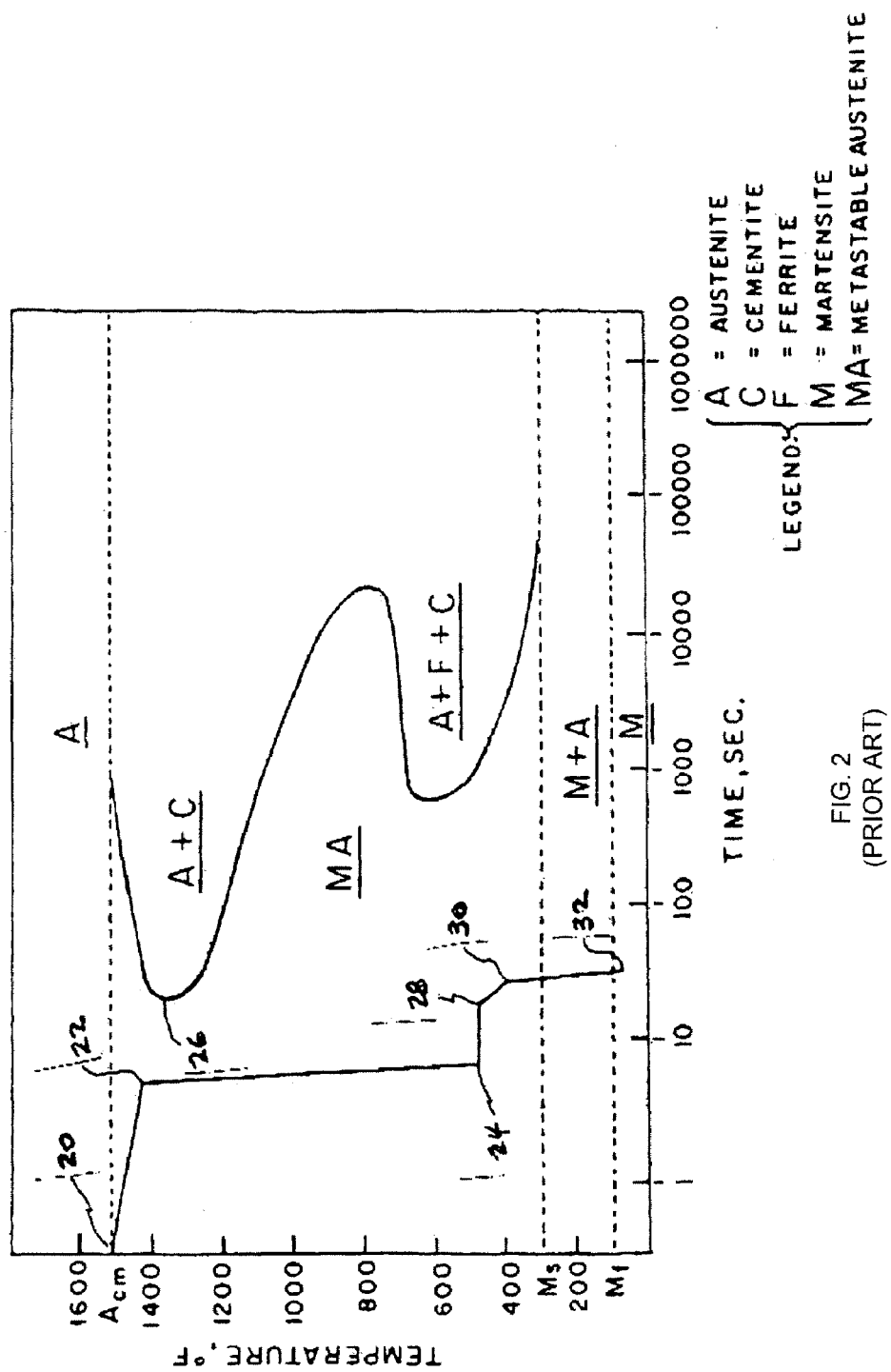
FIG. 2 is a Time-Temperature-Transformation (T-T-T) Diagram of a typical and preferred alloy, 3Ni-1Cr steel used for gear fabrication.

As mentioned above, the present invention eliminates the grinding operation to provide a microstructurally improved gear tooth surface as will now be described. An important part of this invention is to select a carburizing grade steel, such as carburized nickel-chromium steel, which has a transformation curve with a metastable austenitic condition just above the martensitic range for a period of time sufficiently long to allow shaping of the gear teeth surfaces. There is shown in FIG. 2, the time-temperature-transformation chart for nickel-chromium steel carburized to about 1.0% surface carbon. The carburized nickel-chromium steel is commonly used for manufacturing high performance gears in the aerospace industry.

The time-temperature-transformation curves show the times required for austenite to start and to complete transformation at each temperature. Temperature is indicated along the ordinate and time on a logarithmic scale is indicated along the abscissa.

After the carburized gear is heated above its critical temperature to an initial temperature 20, or approximately 1350° F., to render it austenitic, it is rapidly isothermally quenched (marquenched) from point 22 to point 24 at a rate exceeding a critical cooling rate in a liquid medium such as a standard marquenching oil which is maintained just above the temperature at which martensite starts to form and metastable austenite is obtained. A critical cooling rate is defined by the slope of line 22-24 that avoids the nose 26 of the transformation curve where austenite and cementite start to form.

To allow the maximum time for mechanically operating on the surfaces of the workpiece 42 while in the metastable austenitic condition, the cooling step must terminate temporarily at a temperature just above the martensitic condition. In FIG. 2, the point 24 beginning a new temperature plateau ending at point 28 is shown positioned at about 450° F.

Shaping of gear teeth further in accordance with this invention employs a process which is performed between points 24 and 28 whereby gear swaging or rolling or other operations are used to shape the gear teeth by deforming the metastable austenitic carburized layer prior to and before its conversion to martensite. This occurs during a pre-transformation time interval at a temperature below that for recrystallization of austenite and just above the $M_s$ of the carburized layer. This process, to be described, presents a means of developing ultra high strength in the current carburized case hardened gears processed by the conventional heat treat processing.

Following the shaping operation, the gear is transferred to a quench station, as indicated in FIG. 2 by line 28-30. Final quench, preferably utilizing a pressurized gas stream, although a liquid is within the scope of the invention, is initiated at point 30 and is finalized at point 32 in the martensitic range.

Figure 3:
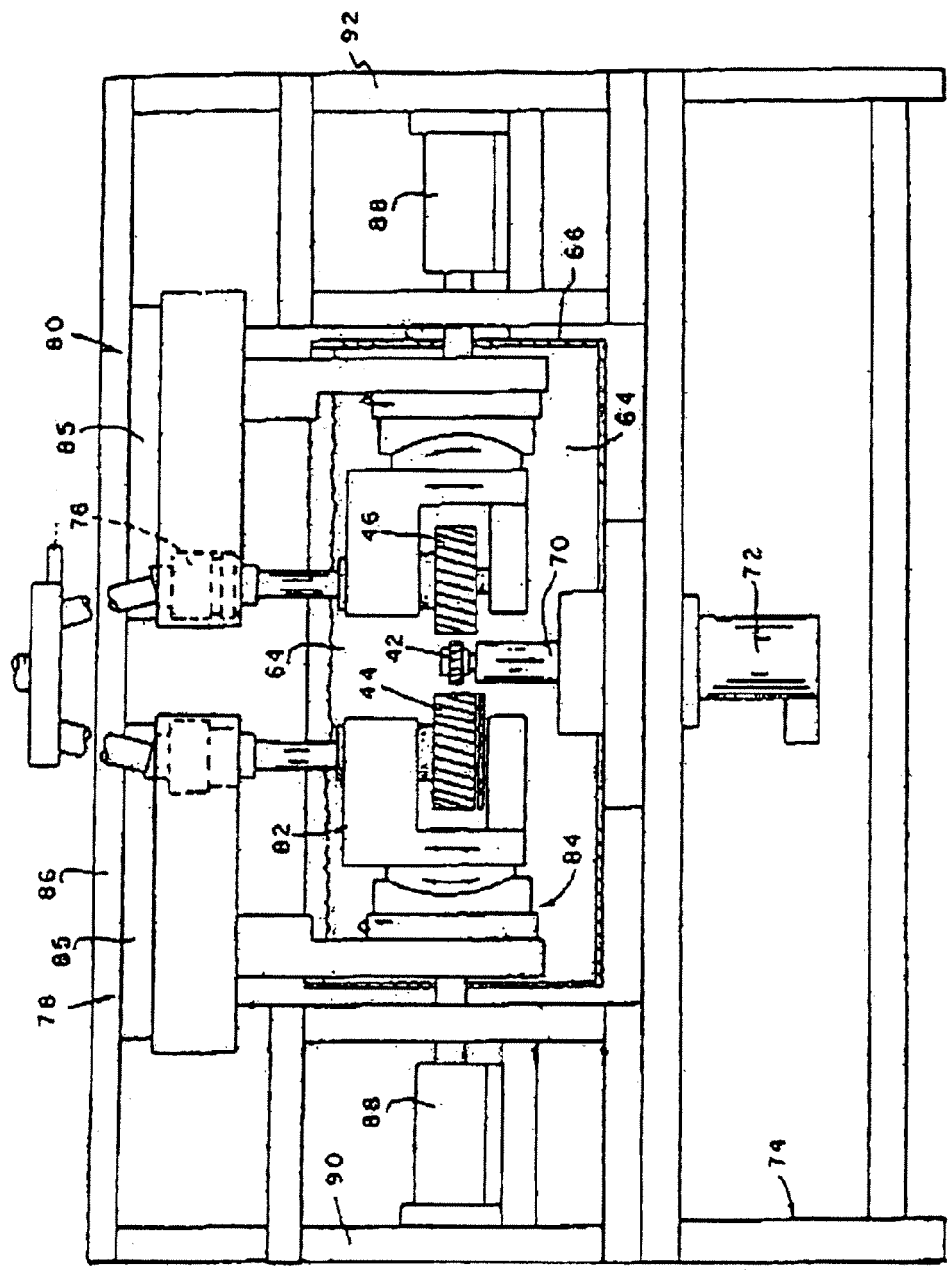
FIG. 3 is a front elevation diagrammatic view illustrating a part of the system illustrated in FIG. 1.
Figure 4:
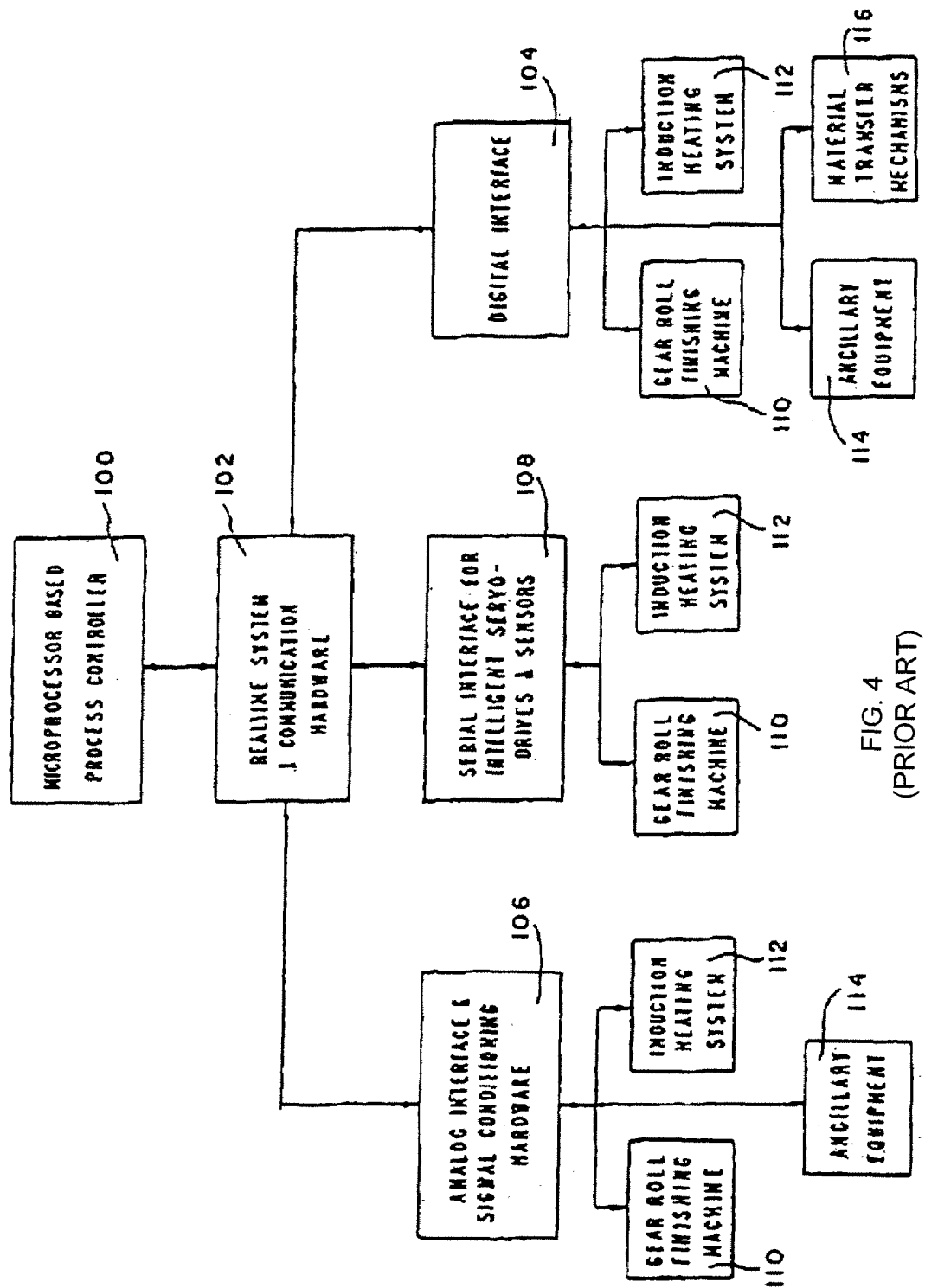
FIG. 4 is a schematic representation of control architecture for performing precision gear finishing by controlled deformation.

At the entrance to the system 40, a workpiece in-chute 48 holds the workpieces to be processed and, upon command from a suitable software driven process controller, releases a workpiece to a gear loader 50 for subsequent transfer to a spin/scan induction heating station 52 by means of a swivel robot 54. The spin/scan station 52 includes a support spindle 56 to accept the workpiece from the swivel robot and servodrives to impart linear and rotary motions to the workpiece. At appropriate times, the support spindle 56 positions the workpiece and drives it at appropriate linear and rotational speeds with respect to MF and RF induction coils 60, 62 respectively, in order for the surface austenitization to be performed then advances it into processing or quench media 64 in a processing tank 66. Contour austenitization of the gear tooth surfaces of each workpiece is achieved by energizing either or both of the MF and RF induction coils using their respective power supplies (not shown) and for appropriate periods of time. The complete surface austenitization cycle is controlled by a dedicated induction heating process controller (not shown), which in turn is supervised by a software driven process controller (not shown). After the induction austenitization of the gear tooth surfaces of the workpiece and the rapid quenching thereof to the metastable austenitic condition, a gear transfer mechanism 68 transfers the workpiece to a through-feed gear holding spindle 70 (FIGS. 1 and 3) for the roll finishing process, as supervised by a process controller 100 (FIG. 4).

A through-feed actuator 72 is mounted on a rigid machine frame 74 of the system 40 and is connected to the through-feed spindle 70, allowing the workpiece both the translatory and rotary motions required for the rolling action. The processing tank 66 is designed to contain the processing or quench media 64 maintained at a temperature of up to 500° F. The tank is anchored to the rigid main frame 74 with suitable seals designed to contain the hot media. Housings for the rolling gear dies and the adjustment mechanisms to align the axes of the rolling gear dies in the in-plane, out-of-plane and axial direction (operations described in detail in U.S. Pat. No. 5,451,275 to Amateau et al. incorporated herein by reference) are all contained in the processing or quench media 64 to maintain the rolling hardware at a thermally stable forming temperature.

The rolling gear dies 44, 46 are power driven through constant velocity joints 76 which allow in-feed motion of the rolling gear dies 44, 46 towards and away from the workpiece 42. This arrangement is particularly well seen in FIG. 3. The drive to at least one of the rolling gear dies is capable of phase adjustment so as to precisely align the rotational phase of one rolling gear die with respect to the other and thereby insure accurate engagement with the workpiece. Both complete in-feed assemblies 78, 80, including rolling gear die housings 82 and adjustment mechanisms 84 are guided on precision linear bearing elements 85 which, in turn, are suspended from bridge 86 of the rigid main frame 74. The in-feed forces and motions are provided by the two in-feed actuators 88 mounted on spaced columns 90, 92 of the rigid frame. The connections between the in-feed actuators 88 and the in-feed assemblies 78, 80 pass through the walls of the processing tank 66, and are properly sealed to prevent drainage of the processing or quench media 64 while allowing the linear in-feed motions.

After the gear roll finishing cycle is completed, a gear transfer system 96, similar to transfer mechanism 68, then accepts the processed workpiece 42 and transfers it to an indexing quench station 98 (FIG. 1) for final transformation to martensite. The processed gear is finally unloaded from the indexing quench station for subsequent operations. Throughout the thermomechanical processing cycle including surface austenitization, rapid quench to metastable austenitic condition, roll finishing, and the final quench to martensite, an enclosure 99 contains and maintains an inert environment of nitrogen or argon, for example, to protect the gear tooth surfaces from oxidation, the recirculating inert gas being continuously monitored for oxygen level, and refurbished as required.

FIG. 4 is a schematic representation of the control architecture for the thermomechanical net shape finishing system 40 and shows the interfacing and interconnections among the various hardware items comprising the system. As depicted in FIG. 4, a controller 100 acts as the overall processing system manager, controlling every operation of the components of the system in a software-driven, coordinated and controlled manner. The controller comprises a microprocessor based system 100 and real time system and communications hardware 102 including electronic interfacing and signal conditioning equipment. The control actions are achieved by digital interfacing 104, analog interfacing and signal conditioning 106, and serial interfacing 108 for intelligent servo-driver and sensors via digital/analog/serial input/output communications between the process controller and the thermomechanical net shape finishing system 40. The major functions of the process controller are (a) control of the gear roll finishing machine 110, (b) control of the induction heating system 112, (c) control of the ancillary equipment 114 which includes several units such as the processing media heating and recirculating unit, the quench media heating and recirculating unit, and the inert gas environment control system, and (d) control of the material transfer mechanism 116 for timely transfer of the workpiece for each of the processing steps involved, which have been described above.

For programmed execution of the process sequence, the process controller operates the various material transfer mechanisms 116 which include modules such as the in-chute 48, gear loader 50, swivel robot 54, the transfer mechanisms 68 and 96, respectively, and the indexing quench station 98. Each of these modules performs one or more of the following functions: gripping of the workpiece 42, vertical (up/down) translation, rotation, extension and retraction of a gripping arm.

Before sending a command to any component of the system 40 for any operation, the process controller 100 confirms by means of digital sensors whether the desired previous operation has indeed occurred, and insures that it is safe to perform the desired next operation. The control of the gear roll finishing machine 110 involves the coordinated operation of the servo-controlled actuators for the through-feed of the workpiece and the in-feed of the two rolling gear dies, the drive from the prime movers to the rolling dies, and the operation of the workpiece holding chuck on the through-feed spindle 70. The control of the induction heating system 112 for the contour gear tooth surfaces austenitization process involves the operation of the servo-controlled drives of the spin/scan station 52, and the energizing/deenergizing of the MF/RF power at induction coils 60, 62 supplied in a programmed sequence. The power supplies have built-in dedicated power levels and on-time controllers for precise monitoring and control of the induction heating process. Finally, the controller 100 communicates with the ancillary equipment 114 for proper operation, again by means of the software driven process control architecture previously mentioned.

As the workpiece 42 advances, it assumes the same elevation of that of a transfer arm 156 of the swivel robot 54 (FIG. 1). As illustrated, the transfer arm 156 can pivot through an arc of at least 180°, from a solid line, or pick-up position to a delivery or dashed line position generally aligned with the induction coils 60, 62 at the heating station 52. It will be appreciated that as the transfer arm 156 is swung from the gear loader 50 to the heating station 52, it passes through an opening 160 in a wall of the enclosure 99. The opening 160 is of a suitable construction to allow passage of the transfer arm 156 while retaining the inert environment provided by the enclosure.

When the transfer arm 156 is moved to the dashed line position illustrated in FIG. 1, the upper actuator mechanism 58 is operable to with draw the support spindle 56 to an initial fully retracted position as indicated by solid lines. As seen in FIG. 5, a terminal end 162 of the support spindle 56 has an expansible chuck 164 which may, for example, be pneumatically operated. With this construction, the chuck 164 can retract to gain entry into the inner cylindrical surface 152 of the workpiece 42, then be caused to expand into engagement therewith. Thus, when the transfer arm 156 has been moved to the dashed line position indicated in FIG. 1, the upper actuator mechanism 58 can be operated to advance the support spindle 56 until the expansible chuck 164 is positioned so as to be generally coextensive with the inner cylindrical surface 152 of the workpiece 42. The chuck 164 is then expanded so as to engage the inner cylindrical surface 152 and the finger members 158 of the transfer arm 156 are caused to release their engagement with the outer peripheral surfaces of the workpiece. Again, the support spindle 56 is caused to be raised and, with it, the workpiece 42. With the workpiece now out of alignment with the transfer arm 156, the latter is returned to its solid line position (FIG. 1) and in position to receive a subsequent workpiece at the gear loader 50.

For a further understanding of the specific construction and operation of the system 40, the reader is again referred to the aforementioned U.S. Pat. No. 5,451,275 to Amateau et al.

The method and apparatus of the present invention relates to low-to-medium carbon and low-to-medium alloyed sintered powder metal steels that are heat treated by carburizing to increase the surface and near surface carbon content and then hardened. The invention is also applicable to medium-to-high carbon and low-to-medium alloyed sintered powder metal steels that do not require the carburizing operation but only require the hardening operation. More specifically, the method and apparatus of the invention are applicable to powder metal gear wheels that are produced by a variety of powder metal processing techniques for pressing, sintering, densification and/or hardening such as

- single or multiple-pressing operations
- single and multiple sintering operations
- integrated sintering and hardening
- integrated sintering, carburizing and hardening
- forged powder metal gear wheel blanks fabricated by any of the above-mentioned processing techniques
- surface densified gear blanks as described in U.S. Pat. No. 5,711,187
- fully densified gear blanks (e.g., forged powder metal gear wheel blanks).

Figure 6:
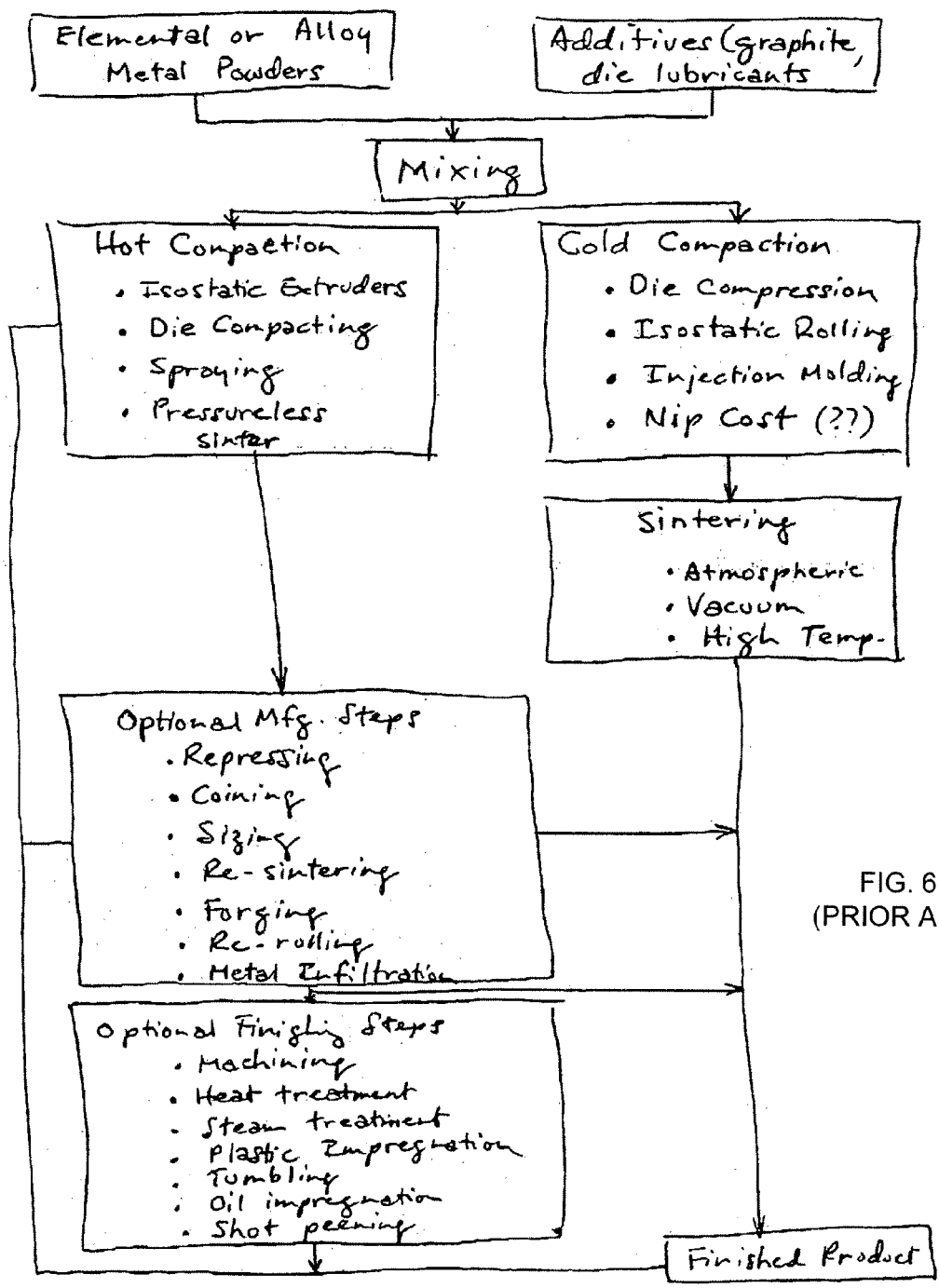
FIG. 6 is a flow chart illustrating conventional powder metallurgy processing.

Before describing the specific technique of the invention, a description of conventional powder metallurgy processes is in order, with particular attention to FIG. 6 which presents a sequence of typical operations. High purity, custom mixed, and alloyed powders intended to be used to manufacture a component are fed into a die, compacted into the desired shape (for example, a near net shaped gear blank), and ejected from the die. The component is then sintered (heated) at a temperature below the melting point of the base material in a controlled atmosphere furnace to form metallurgical bonds among the powder particles. Mixing metal powders in the solid state allows opportunities to engineer material properties unique to powder metallurgy. In FIG. 6, optional post-sintering processes are also presented.

Tooth size reduction in powder metallurgy ausform finishing, an important component of the invention, involves primarily surface compaction due to collapse of the pores and, to a lesser extent, due to the material flow up and down the teeth by rolling and sliding action. Therefore, the die tooth profiles or shapes have to be different in some minute details. As seen in FIG. 7, the tip radius 200 of a die tooth 202 used for wrought steel gear ausforming is of the order of the final fillet radius being produced in the gear root/fillet region, and as generated by the trochoidal path generated by the die tip corners, typical dimensions being illustrated in FIG. 7(a), showing a tip radius 200A in the range of 0.045 to 0.050 inches. In contrast, for powder metal steel gear ausforming, a substantial compaction is required in the root/fillet region also and, as illustrated in FIG. 7(b), the tip radius 200B in the range of 0.014 to 0.018 inches of the die teeth results in a more pronounced shape.

Figure 8:
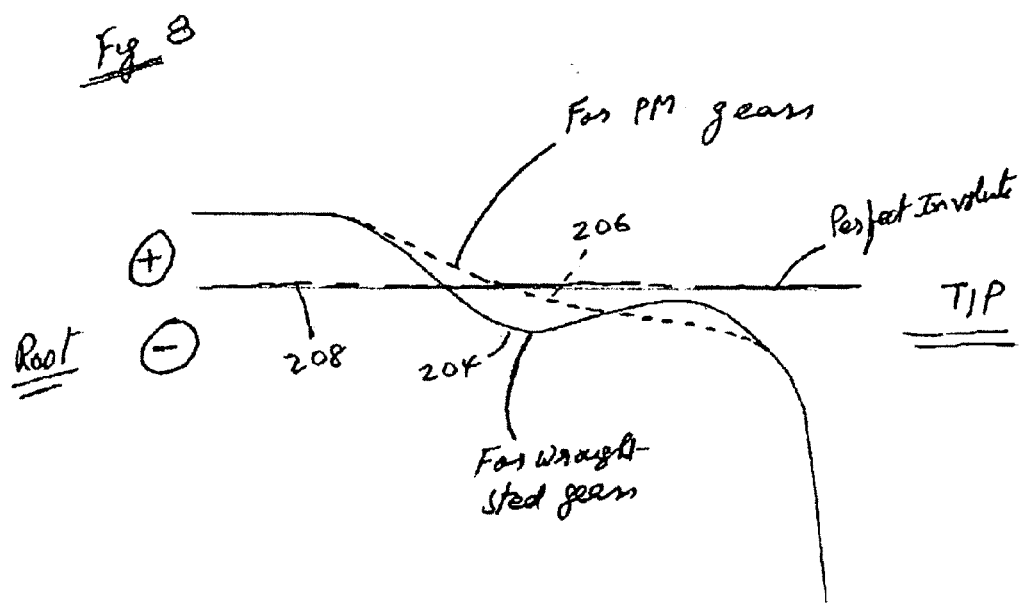
FIG. 8 is a diagrammatic illustration depicting deviations of a die tooth profile, respectively, for a wrought steel gear and for a powder metal steel gear.

In similar fashion, as seen in FIG. 8, as substantial magnitude rolling loads are absorbed in the powder metal instance due to surface compaction, die tooth profiles 204 and 206, respectively, for wrought steel gears and for powder metallurgy steel gears, which are indicated as deviations from a true involute profile 208, result with the pronounced differences shown.

As earlier mentioned, the technique of the present invention may be integrated with or partially performed by equipment of the type disclosed in U.S. Pat. No. 5,451,275 to Amateau et al. and referred to above.

Figure 9:
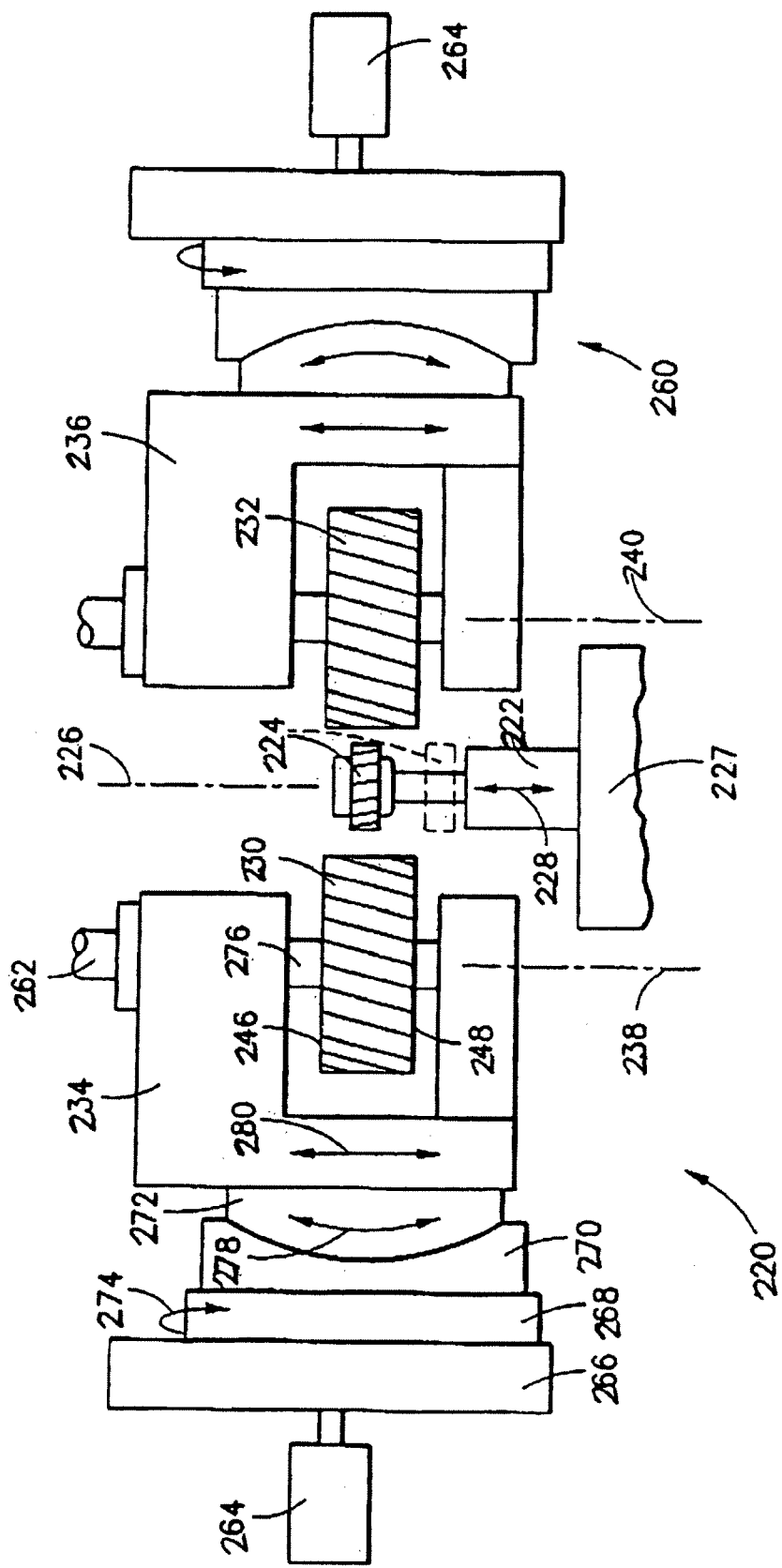
FIG. 9 is a front elevation diagrammatic view diagrammatically illustrating known apparatus which can be employed for net shaping a high performance gear from a powder metal workpiece by controlled deformation.

Turning now to FIG. 9, known apparatus 220 for performing precision gear finishing by controlled deformation but appropriate for use with the present invention, employs a fixed axis spindle 222 which releasably supports a workpiece 224 for rotation about an axis 226 and is associated with a through-feed actuator 227 capable of moving the workpiece in through-feed directions indicated by a double-headed arrow 228 between a dashed line position and a solid line position. Additionally, a pair of rolling dies 230, 232 are supported on rolling die housings 234, 236, respectively, for rotation on generally parallel spaced axes 238, 240. When the workpiece 224 is in the solid line position, it is aligned or coextensive with the rolling dies.

Figure 10:
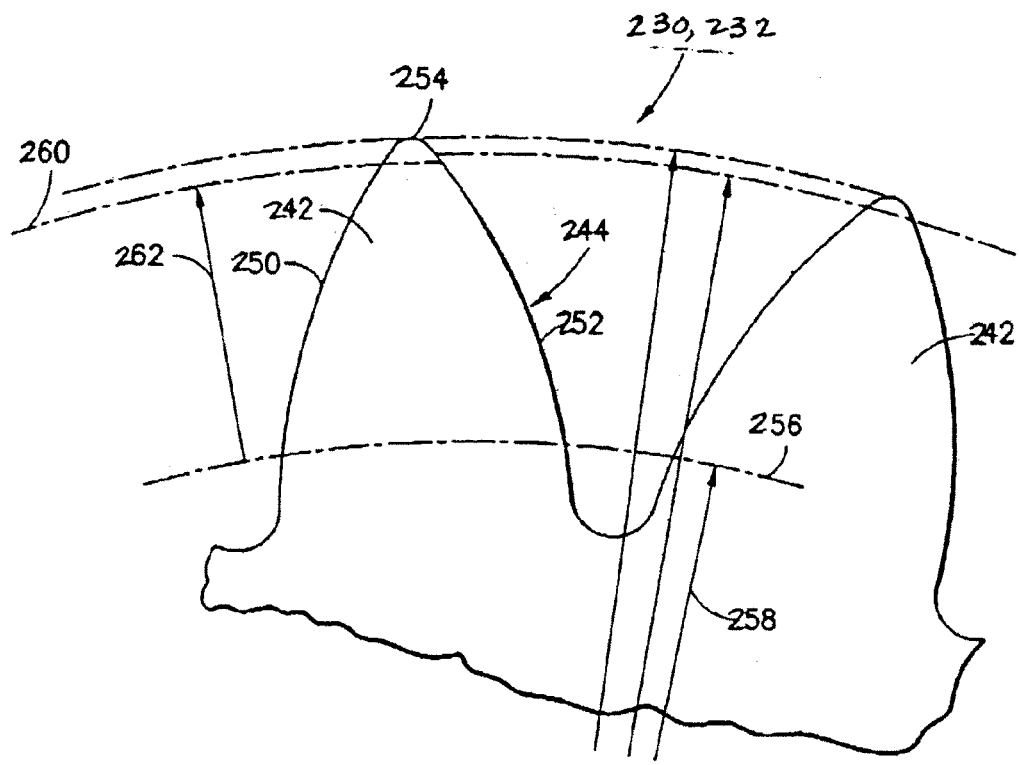
FIG. 10 is a diagrammatic elevation view of a part of a rolling die employed for purposes of the invention and designed to be conjugate to the required finished gear tooth profile.

Viewing FIG. 10, each rolling die has a plurality of teeth 242 and an outer peripheral contoured surface 244 extending between generally parallel spaced lateral surfaces 246, 248 transverse to the axes 238, 240. Each tooth 242 includes a tooth flank with opposed nominally involute surfaces 250, 252 and a tooth tip surface 254. While the surfaces 250, 252 are nominally, or essentially, involute surfaces, they may be slightly modified at their ends to improve performance. Continuing to view FIG. 10, the involute surfaces 250, 252 extend along the contoured surface 244 between an intersection with a circumferential line 256 having a radius 258 and a circumferential line 260 having a radius 262. The circumferential line 256 defines the innermost locus of points on the teeth 242 which will engage the teeth of the workpiece 224 during the finishing operation yet to be described and the circumferential line 260 defines the outermost locus of points on the teeth 242 which will engage the teeth of the workpiece 224 during the finishing operation.

For purposes of the present disclosure, the workpiece 224 is referred to initially as a "near net shaped gear blank" and when all processes of the invention have been completed, it is referred to as a "net shaped gear". As a near net shaped gear blank, it may have been hobbed or otherwise formed using conventional techniques. As such, for purposes of the invention, the workpiece 224 is formed with its gear teeth approximately 0.002 to 0.004 inches oversized in tooth thickness relative to the final or desired size so that the net shaped gear can meet the dimensional tolerances of AGMA required for high performance gears without the necessity of grinding. The displacement of the metal during the deforming operations performed in accordance with the invention serves to remove the excess tooth thickness while assuring the proper profile. Grinding is eliminated, and for this reason alone, there can be as much as a 70% increase in surface durability at any given contact stress level.

The housings 234, 236 for the rolling dies 230, 232 and adjustment mechanisms 260 to align the axes of the rolling dies in the in-plane, out-of-plane and axial direction (all to be subsequently described) are all contained in processing or quench media (not shown) to maintain the rolling hardware at a thermally stable forming temperature. The rolling dies 230, 232 are power driven through constant velocity joints 262 which allow in-feed motion of the rolling dies 230, 232 towards and away from the workpiece 224. The drive to at least one of the rolling dies is capable of phase adjustment so as to precisely align the rotational phase of one rolling gear die with respect to the other and thereby insure accurate engagement with the workpiece. The in-feed forces and motions are provided by the two in-feed actuators 264.

An in-feed assembly frame 266 is a first component to be operated by the actuator 264. A support block 268 is mounted on the in-feed assembly frame 266, then a helical adjustment plate 270 is mounted on the support block 268, then a parallel adjustment plate 272 is mounted on the plate 270. Finally, the bifurcated rolling gear die housing 234, 236 is mounted on the adjustment plate 272. The mounting construction between each successive pair of the components is different so as to provide for a different type of movement of the rolling dies 230, 232 with respect to the workpiece 224. More specifically, the helical adjustment plate 270 is movable relative to the assembly frame 266 (and support block 268) in a manner indicated by arcuate double arrowhead 274. Movement of this nature is effective to adjust the rolling gear die 244 out of a common plane nominally defined by the axes of drive shafts 276 and of the through-feed spindle 222.

In a similar fashion, the parallel adjustment plate 272 is mounted on the helical adjustment plate 270 for relative motion as generally indicated by an arcuate double arrowhead 278. Adjustment of the rolling dies 230, 232 is thereby achieved within a common plane containing the longitudinal axes of the drive shafts 276 and of the through-feed spindle 224.

Finally, the rolling die housings 234, 236 are movable relative to the parallel adjustment plate 272 in directions represented by a double arrowhead 280, by reason of which the rolling dies 230, 232 are movable along their own axes of rotation relative to the workpiece 224.

Figure 11:
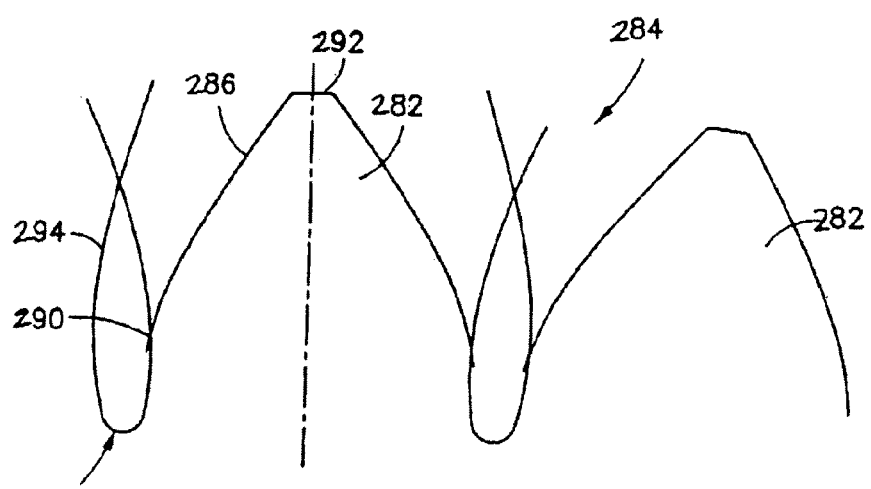
FIG. 11 is a diagrammatic elevation view of a part of a gear being form finished according to the techniques of the invention and illustrating both the involute and trochoidal regions.
Figure 12:
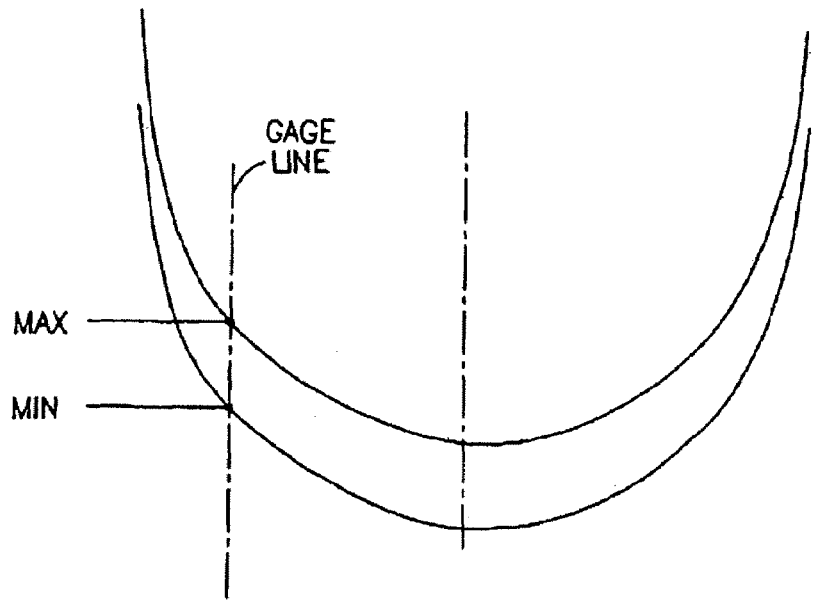
FIG. 12 is a diagrammatic elevation view illustrating the dimensional tolerance on the trochoidal contour of the root/fillet region of a gear formed in accordance with the invention.
Figure 13:
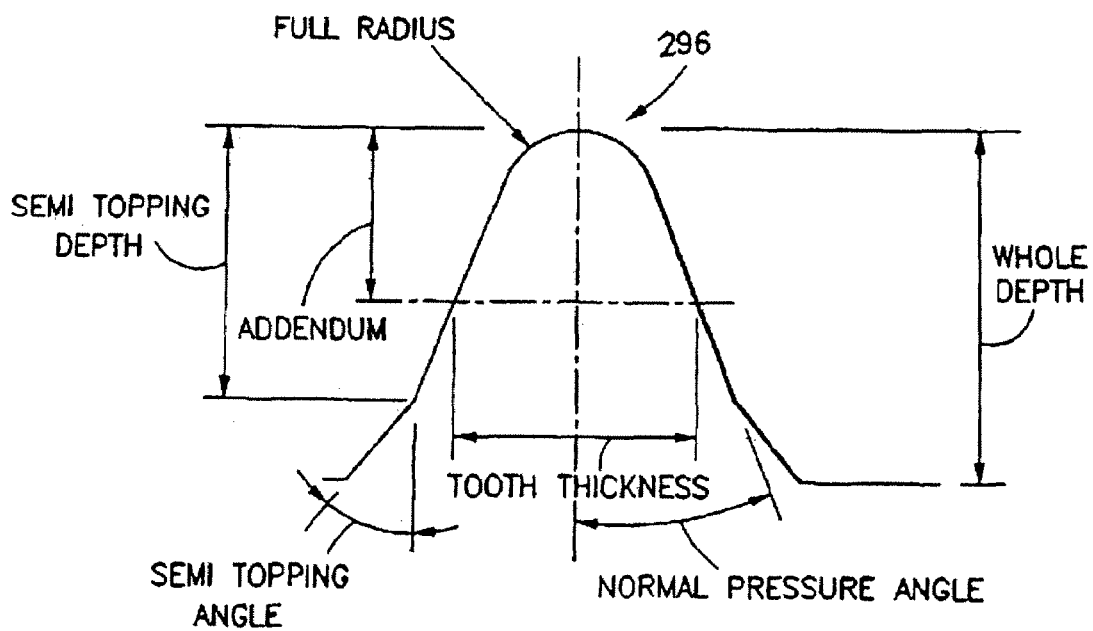
FIG. 13 is a diagrammatic elevation view illustrating the profile of a rack tooth form used to generate an as-hobbed gear workpiece.

Viewing FIG. 11, involute gear tooth profiles are generated from rack tooth form. They comprise two distinct regions of gear teeth 282 of a typical gear 284, namely, the active contacting tooth flank surfaces 286 which have an involute tooth form, and the root/fillet region 288 which has a trochoidal tooth form. FIG. 11 illustrates these two regions and the point of tangency 290 between the regions. Gear designs specify the point of tangency 290, called the profile finish diameter, and the active contacting surface starts from this point and continues to near the outer diameter or tip 292 of the gear teeth. Below the profile finish diameter, that is, radially toward the center of the gear 284, the contour of the root/fillet region is prescribed in terms of the minimum fillet radius and the root diameter. The curve 294 is a trochoidal curve generated by the tip of the hobbing tool with the rack tooth form that is used to machine the gear teeth, and defines the root/fillet region 288. Further specifications for this region may also include dimensional tolerance on the trochoidal contour as shown in FIG. 12. An example of a rack tooth form used to design a gear hobbing tool 296 is shown in FIG. 13. Hobbing is one way of producing gear teeth by machining.

Figure 14:
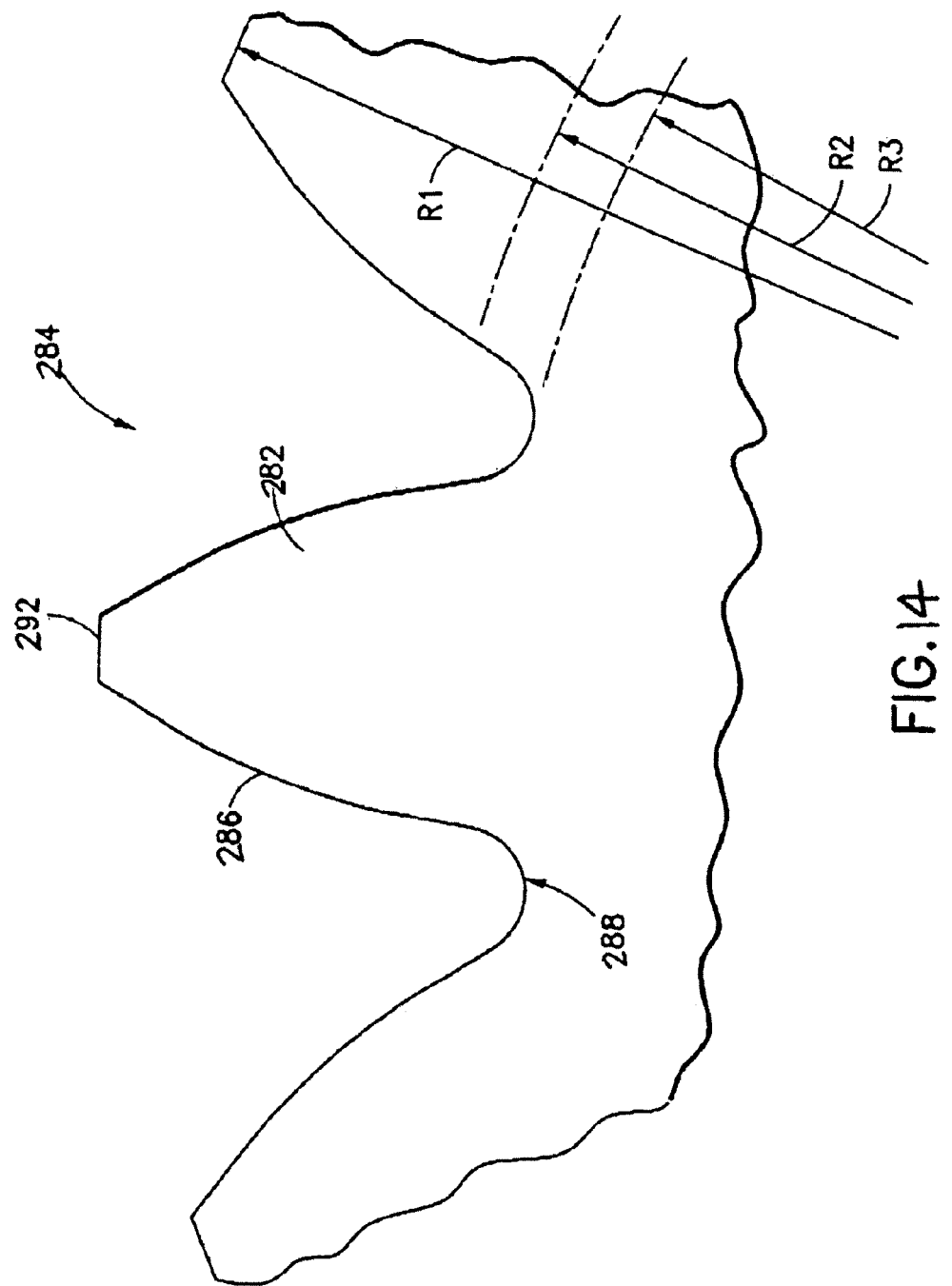
FIG. 14 is a diagrammatic elevation view, similar to FIG. 3, of a part of a gear being formed according to the techniques of the invention and illustrating both the involute and trochoidal regions.

The design method to produce the desired rolling die tooth and tip profile proceeds from the definition of the required gear geometry and the definition of the basic rack form described above. Hence the transverse profile of gear teeth, which may be of the helical design or of the spur design, is first completely defined both in the area of active contact and in the area of the root/fillet, as shown for a typical gear 284 in FIG. 14. The as-hobbed gear tooth profile produced for subsequent full form roll finishing includes a smoothly varying non-uniform rolling stock along the entire contour of the gear teeth.

Figure 15:
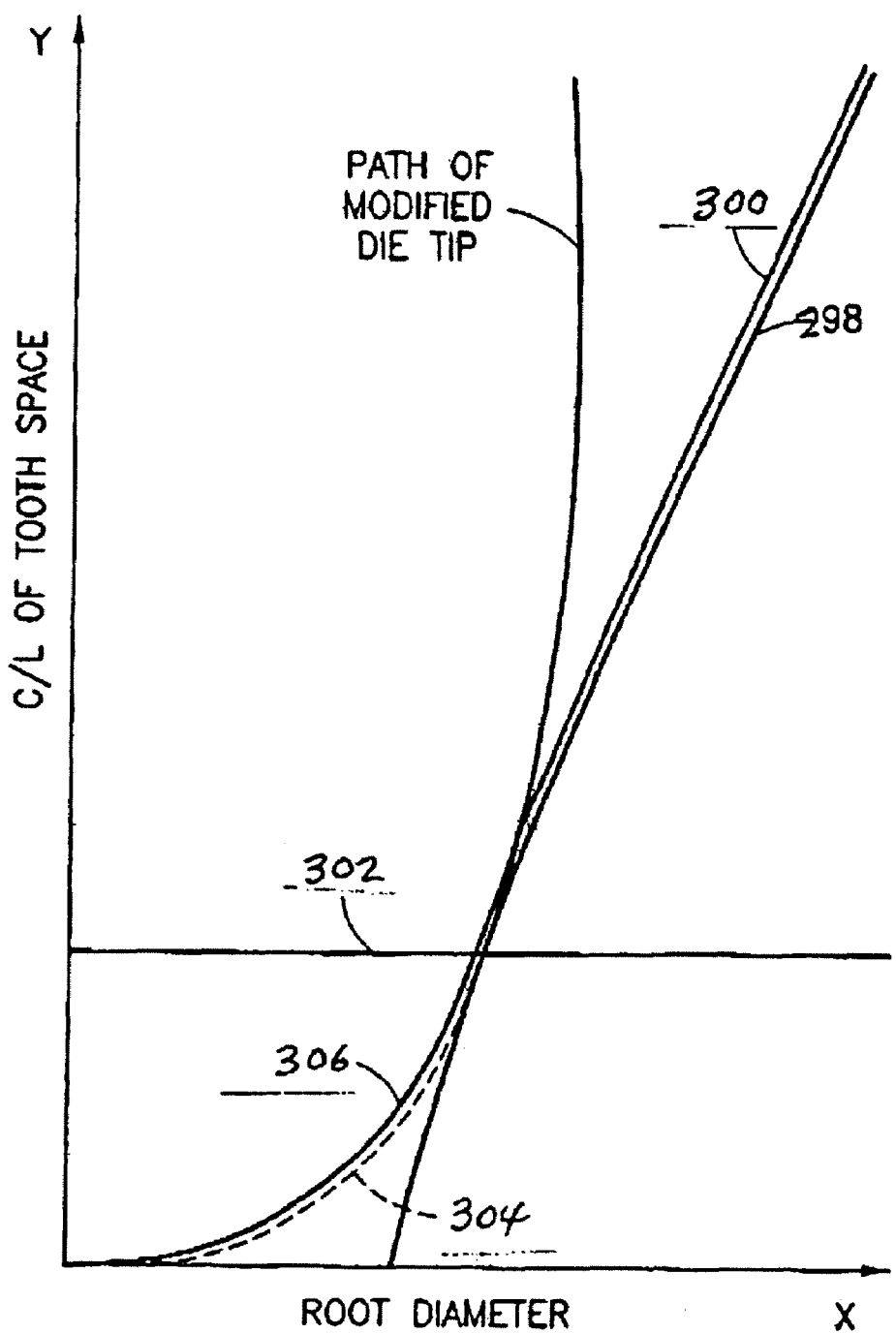
FIG. 15 is a diagrammatic illustration in a coordinate system of a typical roll finished gear tooth profile combined with the trace of the as-hobbed gear tooth profile with a rolling stock along the entire contour of the workpiece gear.

The technique of full form roll finishing is another important component of the current invention, and is diagrammatically illustrated in FIG. 15. FIG. 15 shows a typical roll finished gear tooth profile 298, as well as the trace of the as-hobbed gear tooth profile 300 with a rolling stock along the entire contour of the workpiece gear. For conventional roll finishing, the rolling stock would exist only above (that is, radially away from the center of the gear) the location defined by a line 302 referred to as the marked profile finish diameter. The die tooth tip surface 254 would be relieved so as not to interfere in the trochoidal region. However, the intention of the current invention is to plastically work the workpiece gear trochoidal or root/fillet region 288 in addition to the tooth flank surfaces 286. Therefore, an improved design of the rolling dies 230, 232 is disclosed with a modified tooth tip surface profile 254 that enables working of the root/fillet region. FIG. 15 also shows the trace 304, using dashed lines, of the rolling die tooth tip 254, and clearly shows the amount of material that would be plastically deformed along the entire contour of the gear teeth, the solid line trace 306 representing the root/fillet profile resulting from the hobbing operation. The tooth flanks or involute surfaces 250, 252 of the rolling die teeth 242 plastically deform and finish the active tooth flank contacting surfaces of the workpiece gear 224, whereas the tooth tip surface 254 of the rolling die teeth work the regions below the profile finish diameter 302, that is, the trochoidal root/fillet regions 288.

Figure 16:
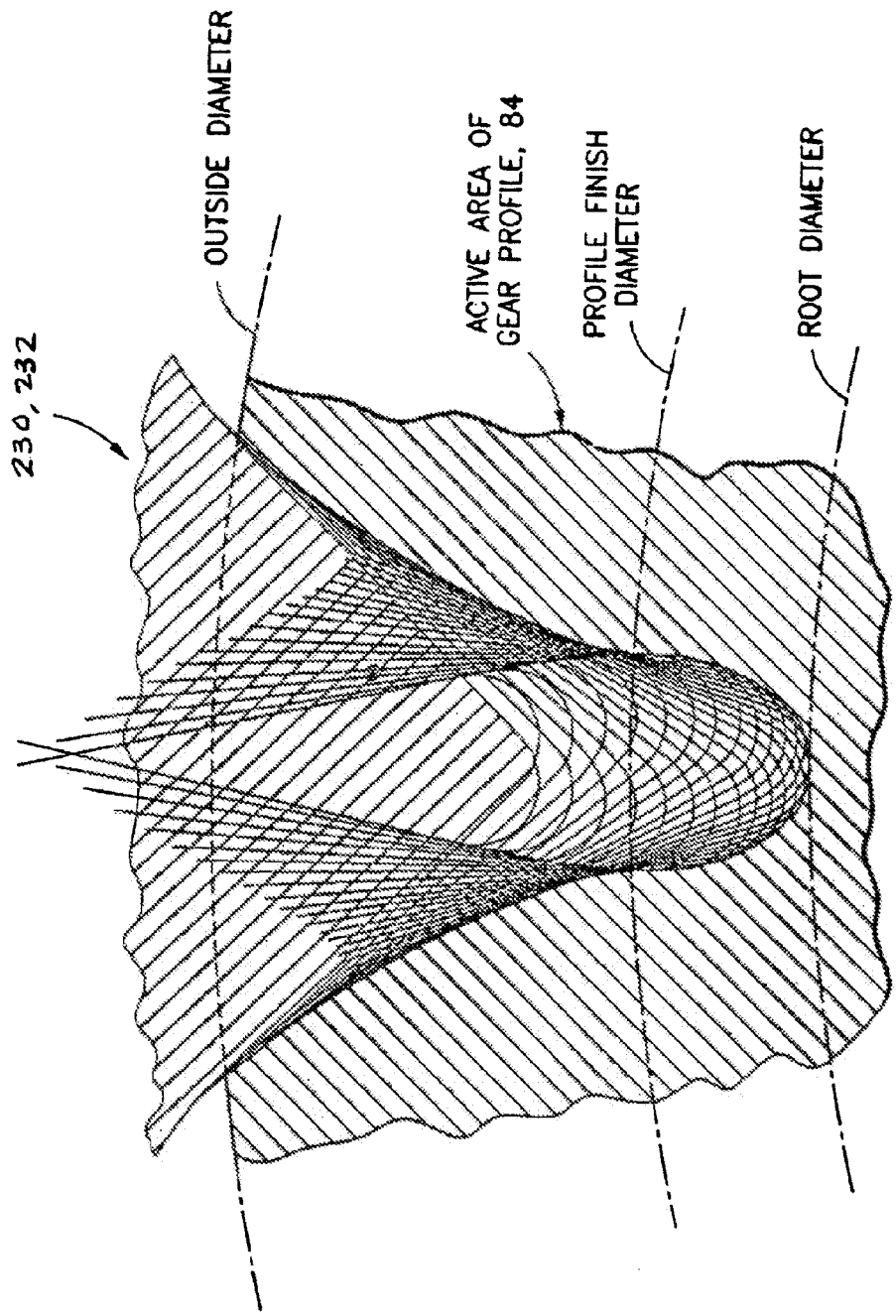
FIG. 16 is a diagrammatic detail cross section view illustrating the conjugate meshing of a rolling die and the workpiece gear, according to the techniques of the invention and depicting the roll finishing action in several incremental steps to produce the final desired tooth profile.

In order to effect material flow consistent with the stock to be moved along the entire gear tooth profile, it is necessary that a constant angular velocity be maintained between the roll finishing die and the workpiece gear 224 along the contacting path. Furthermore, in order to maintain a constant angular velocity, it is therefore necessary to produce on the rolling dies a tooth profile which is conjugate to the finished gear tooth profile during all phases of the engagement as shown in FIG. 15. A pair of mating gear tooth profiles are essentially cams, the driving tooth acting against the other to produce desired relative motion. One of the tooth profiles may be chosen at random, and the corresponding correct profile of the mate can be developed to produce uniform relative motion. The characteristics of the two mating gear tooth profiles are therefore interdependent, or conjugate, to ensure transmission of uniform rotary motion. FIG. 16 shows the conjugate meshing of one tooth of the rolling dies 230, 232 and the workpiece gear 284, and shows the roll finishing action in several incremental steps to produce the final desired tooth profile. The design method currently used by the industry utilizes rolling dies that are conjugate only up to the profile finish diameter, and therefore are capable of finishing only the active contacting surfaces. This invention is unique in that the die tooth profile maintains conjugacy in the root/fillet area of the gear tooth in addition to the area of active contact. FIG. 10, previously discussed, diagrammatically illustrates the profile of the rolling dies 230, 232, including the tooth tip surface used to deform the trochoidal root/fillet area and the remaining profile to finish the active contacting surfaces of the teeth 282 of the workpiece gear 284. The conjugate tooth profile of the die is determined based upon the meshing conditions and the complete transverse profile of the gear tooth that was described above.

The manufacturing method for producing the rolling die is by a precision form grinding technique. The rolling die tooth profile described above is dressed into a grinding wheel 308 by means of a disk-shaped diamond roll 310 having an outer peripheral surface 311 which engages the grinding wheel and follows a path indicated by an arrow 312, as shown in FIG. 17. The dressed grinding wheel 308 is then used to grind or produce the die tooth form. This technique is essentially similar to the technique for producing conventional rolling dies to finish only the active tooth surfaces. However, for the present invention, the diamond roll must precisely dress the profile of the die tooth tip surface 284. The required rolling die tooth profile coordinates determined from the design procedure described above are input to a CNC (computer numerically controlled) gear form grinding machine. This data is used for the dressing operation. The critical requirement here is the sharp radius of the diamond roll required for producing the profile in the grinding wheel. Typically, dressing diamond rolls exhibit a tip radius of about 0.025" to 0.050", which is adequate for conventional rolling dies. However, for full form rolling, a much smaller radius in the range of about 0.005" to about 0.012" is required to assure precise control of the generated die tooth profile shape as described in FIG. 15.

Dressing the grinding wheel is the process used to shape the wheel to a specific profile, in order to generate the required rolling die tooth flank and tip profile. The grinding wheel produces the normal space between two adjacent teeth in form-grinding operations, and represents a rack for generating-grinding operations. For dressing, the grinding wheel is mounted on its wheel holder, balanced and then mounted on a machine spindle. Using a diamond tool, dressing is carried out by a combination of radial and axial motions of the diamond tool, while the grinding wheel is spinning at speeds close to or at grinding speed. Computer numerical control is used for the coordinated radial and axial motion of the dressing tool to precisely dress or shape the grinding wheel, so that the grinding wheel will in turn produce the desired shape on the rolling die teeth. Grinding wheel dressing is also used to remove any dulled abrasive grains and to expose the sharp next layer of the abrasive grains. The critical step is to control the dressing tool so that the calculated rolling die tooth profile and tip geometry is achieved.

FIG. 18 compares the tooth profiles of workpiece gears in the as-hobbed and roll finished condition. The figure clearly demonstrates that a smoothly varying amount of material stock has been roll finished from the entire gear contour by means of full form roll finishing tooling developed as described and disclosed above.

A technique has now been disclosed for performing in one continuous operation full form roll finishing of critical regions of the teeth of contacting machine elements, namely, powder metal gears, including the active contacting surfaces of the tooth flanks and the trochoidal root/fillet regions. The technique utilizes conjugate parallel-axis roll finishing dies with die tooth tip profile specially designed to trace the specified finished gear tooth profile. Machine elements that are to be full form roll finished are produced with a prescribed smoothly varying roll finishing stock along the entire tooth contour. The tooling development and processing technique are disclosed for plastically deforming the smoothly varying rolling stock along the entire gear tooth contour by conjugate meshing action.

Although the present invention has been described with reference to the embodiments shown in the drawings, it should be understood that the present invention can be embodied in many alternate forms of embodiments. In addition, any suitable size, shape or type of elements or materials could be used. Thus, while preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A method for net shaping gear teeth of a high performance power transmission gear from a powder metal workpiece, comprising the steps of:
   (a) heating a powder metal workpiece in the form of a near net shaped gear blank having gear teeth surfaces above its critical temperature to obtain an austenitic structure throughout its surfaces;
   (b) isothermally quenching the workpiece at a rate greater than the critical cooling rate of its surfaces to a uniform metastable austenitic temperature just above the martensitic transformation temperature;
   (c) rolling the gear teeth surfaces of the workpiece to a substantially finished outer peripheral profiled gear tooth shape from tooth tip to tooth root on both sides of the gear teeth between opposed dies, each die having an outer peripheral powder metal gear tooth finishing surface that substantially deviates from a nominal involute tooth geometry, the outer peripheral powder metal gear tooth finishing surface being configured to geometrically finish the powder metal surface of each tooth, from tooth tip to tooth root on both sides of the gear tooth, during rolling so that the geometrically finished tooth, from tooth tip to tooth root on both sides of the gear tooth, has dimensional tolerances for power transmission gearing, while holding the workpiece at the uniform metastable austenitic temperature, the gear teeth surfaces undergoing densification, plastic deformation, strengthening and final shaping as a result of the rolling operation; and
   (d) cooling the workpiece through the martensitic range to thereby harden the surfaces of the gear teeth.

2. The method set forth in claim 1 wherein step (c) includes the steps, sequentially, of:
   (e) radially compacting the material in the gear teeth surface layers resulting in a collapse of the pores initially existing in the gear teeth surface regions with resulting densification of the gear teeth surface regions; and
   (f) plastically deforming the gear teeth surface layers by causing lateral material flow of the gear teeth surface layers as a result of the operation of rolling in the metastable austenitic temperature range.

3. The method set forth in claim 1, including the steps, before step (a) of sequentially:
(e) pressing the workpiece;
(f) sintering the workpiece; and
(g) densifying the workpiece.

4. The method set forth in claim 1 including the steps, before step (a) of:
(e) pressing the workpiece; and
(f) sintering the workpiece.

5. The method set forth in claim 4 wherein step (e) includes the steps, alternatively, of:
(h) single pressing the workpiece; and
multiple pressing the workpiece.

6. The method set forth in claim 4 wherein step (f) includes the steps, alternatively, of:
(h) single sintering the workpiece; and
(i) multiple sintering the workpiece.

7. The method set forth in claim 4 wherein step (f) includes the step of:
(g) sintering and hardening the workpiece in an integrated operation.

8. The method set forth in claim 4 wherein step (f) includes the step of:
(g) sintering, hardening, and carburizing the workpiece in an integrated operation.

9. The method set forth in claim 4 including the step of:
(g) applying densifying pressure to surfaces of at least the gear tooth root and gear tooth flank regions of the pressed and sintered powder metal gear blank to establish densification in the range of 90 to 100 percent of full theoretical density to a depth of about 70 microns and up to about 1300 microns.

10. The method as set forth in claim 1 for fabricating a parallel axis gear.

11. The method as set forth in claim 10 wherein the parallel axis gear includes at least one of a spur gear, a helical gear, and a double helical gear.

12. The method as set forth in claim 1 for fabricating an intersecting axis gear.

13. The method as set forth in claim 12 wherein the intersecting axis gear includes at least one of a straight bevel gear, a spiral bevel gear, a hypoid gear, a worm gear, and a worm-wheel gear.

14. The method as set forth in claim 1 wherein the root/fillet region of the gear teeth are compacted with a rolling die having a tip radius from about 0.014 to about 0.018 inches.

15. A method of producing net shaped gear teeth from a near net shape workpiece of powder metal having an initial outer peripheral contoured surface, each gear tooth having a gear tooth flank with a nominally involute surface and a root/fillet region with a trochoidal surface, the method comprising the steps of:
(a) rotatably supporting on a first axis a rolling die having an outer peripheral contoured surface extending between generally parallel spaced lateral surfaces transverse to the first axis, the rolling die including a plurality of teeth, each gear tooth including a tooth flank with opposed involute surfaces and a tooth tip surface;
(b) rotatably supporting on a second axis distant from and parallel to the first axis a near net shape powder metal workpiece having an initial outer peripheral contoured surface and including a plurality of gear teeth, each gear tooth having a tooth flank with a nominally involute surface and a root/fillet region with a trochoidal surface;
(c) advancing the rolling die in an in-feed direction generally perpendicular to the first and second axes such that the rolling die meshingly engages with the workpiece;
(d) rotating the rolling die about the first axis while engaged with the workpiece;
(e) rolling the gear teeth surfaces of the workpiece to a substantially finished outer peripheral profiled gear tooth shape from tooth tip to tooth root on both sides of the gear teeth while engaged with the rolling die having an outer peripheral powder metal gear tooth finishing surface configured to geometrically finish the powder metal surface of each tooth, from tooth tip to tooth root on both sides of the gear tooth, during rolling so that the geometrically finished tooth, from tooth tip to tooth root on both sides of the gear tooth, has dimensional tolerances for power transmission gearing without subsequent grinding of the powder metal surface of the gear tooth, while holding the workpiece at the uniform metastable austenitic temperature, the powder metal gear teeth surfaces undergoing densification, plastic deformation, strengthening and final shaping as a result of the rolling and sliding operation;
(f) while performing step (d), maintaining continuous conjugacy between the rolling die and the workpiece with the involute surface of each tooth of the rolling die engaging the involute surface of a mating tooth of the workpiece and the tooth tip of the rolling die engaging the trochoidal root/fillet surface between adjacent mating gear teeth of the workpiece to effect material flow along the outer peripheral contoured surface;
(g) continuing to advance the rolling die in the in-feed direction thereby deforming the surface of each powder metal gear tooth flank and of a corresponding root/fillet region until a final net shape of each gear tooth and root/fillet region is achieved; and
(h) continuing to perform all of the preceding steps with the rolling die and workpiece meshingly engaged, thereby deforming the involute and trochoidal root/fillet surfaces of all of the gear teeth of the workpiece resulting in a final net shaped gear.

16. The method set forth in claim 15 wherein step (e) includes the steps of:
(i) radially compacting the material in the gear teeth surface layers resulting in a collapse of the pores initially existing in the gear teeth surface regions with resulting densification of the gear teeth surface regions; and
(j) plastically deforming the gear teeth surface layers by causing lateral material flow of the gear teeth surface layers as a result of the operation of rolling and sliding in the metastable austenitic temperature range.

17. A method as set forth in claim 15 including the step, before step (c) of:
(i) advancing the workpiece in a through-feed direction parallel to the first and second axes such that the outer peripheral profiled surface of the workpiece engages the outer peripheral profiled surface of the rolling die and continues to advance until the workpiece is positioned substantially coextensive with the rolling die in the through-feed direction.

18. A method as set forth in claim 17 wherein step (c) includes the steps of:
(i) simultaneously with step (g) after the workpiece and rolling die are substantially enmeshed, advancing the rolling die within a plane containing the first and second axes, in an in-feed direction substantially perpendicular to the first and second axes until the outer peripheral surface of the rolling die engages the outer peripheral surface of the workpiece at a near net shaped center distance establishing an initial center distance between the first and second axes when the workpiece and the rolling gear die are initially engaged; and (j) continuing to advance the workpiece in the in-feed direction by an additional increment of center distance thereby deforming the profile surfaces of each gear tooth resulting in final net shape of the teeth.

19. A method of producing a full form net shaped gear from a near net shape powder metal workpiece having an initial outer peripheral contoured surface and including a plurality of gear teeth, each gear tooth having a gear tooth flank with a nominally involute surface and a root/fillet region with a trochoidal surface, the method comprising the steps of:

(a) providing a cylindrical grinding wheel having an outer peripheral surface and rotatable about an axis;

(b) dressing the grinding wheel by advancing a dressing tool into engagement with the outer peripheral surface to remove material therefrom to thereby produce a grinding wheel profile having a desired contoured outer surface;

(c) supporting on an axis which lies in a plane parallel to the plane of the grinding wheel axis but perpendicular to the grinding wheel axis a cylindrical rolling die blank having a plurality of circumferentially spaced near net shaped teeth defining an arcuate pitch length between adjacent teeth, each pair of adjacent teeth having opposed gear tooth surfaces and a common root/fillet region therebetween;

(d) advancing the grinding wheel radially toward and into engagement with the rolling die blank such that the contoured outer surface thereof engages the opposed gear tooth surfaces and the common root/fillet region between two adjacent teeth of the rolling die blank;

(e) simultaneously with step (d), rotating the grinding wheel about its axis to produce a final gear tooth profile for the opposed gear tooth surfaces and its common root/fillet region;

(f) withdrawing the grinding wheel from engagement with the rolling die blank;

(g) rotating the rolling die blank on its axis by an increment equal in arc length to the pitch between adjacent teeth thereof so that the grinding wheel is aligned with the opposed gear tooth surfaces and common root/fillet region of the next successive pair of adjacent teeth of the rolling die blank;

(h) repeating steps (d), (e), (f), and (g) until all of the teeth of the rolling die blank have been ground to the desired shape and resulting in a finished rolling die;

(i) rotatably supporting the finished rolling die on a first axis, the rolling die having an outer peripheral contoured surface extending between generally parallel spaced lateral surfaces transverse to the first axis, the rolling die including a plurality of teeth, each including a gear tooth flank with opposed involute surfaces and a gear tooth tip surface;

(j) rotatably supporting the powder metal workpiece on a second axis distant from and parallel to the first axis;

(k) advancing the rolling die in an in-feed direction generally perpendicular to the first and second axes such that the rolling die meshingly engages with the workpiece, (l) rotating the rolling die while engaged with the workpiece;

(m) rolling the gear teeth surfaces of the workpiece to a substantially finished outer peripheral profiled gear tooth shape from tooth tip to tooth root on both sides of the gear teeth while engaged with the rolling die having an outer peripheral powder metal gear tooth finishing surface that substantially deviates from a nominal involute tooth geometry, the outer peripheral powder metal gear tooth finishing surface configured to geometrically finish the powder metal surface of each tooth, from tooth tip to tooth root on both sides of the gear tooth, during rolling so that the geometrically finished tooth, from tooth tip to tooth root on both sides of the gear tooth, has dimensional tolerances for power transmission gearing, while holding the workpiece at the uniform metastable austenitic temperature, the gear teeth surfaces undergoing densification, plastic deformation, strengthening, and final shaping as a result of the rolling and sliding operation;

(n) while performing step (l), maintaining continuous conjugacy between the rolling die and the workpiece with the involute surface of each tooth of the rolling die engaging the involute surface of a mating tooth of the workpiece and the tooth tip of the rolling die engaging the trochoidal root/fillet surface of a mating tooth of the workpiece; and (o) continuing to advance the rolling die in the in-feed direction thereby deforming the surface of each gear tooth flank and of a corresponding root/fillet region until a final net shape of each gear tooth and of each root/fillet region is achieved, and (p) continuing to perform steps (i), (j), (k), (l), (m), and (n) with the rolling die and workpiece meshingly engaged, thereby deforming the involute and trochoidal root/fillet surfaces of each tooth of the workpiece resulting in a final net shape of all of the teeth thereof.

20. The process set forth in claim 19 wherein step (e) includes the steps of:

(q) radially compacting the material in the gear teeth surface layers resulting in a collapse of the pores initially existing in the gear teeth surface regions with resulting densification of the gear teeth surface regions; and (r) plastically deforming the gear teeth surface layers by causing lateral material flow of the gear teeth surface layers as a result of the operation of rolling in the metastable austenitic temperature range.

21. A method of producing a full form net shaped gear from a near net shape powder metal workpiece having an initial outer peripheral contoured surface and including a plurality of teeth, each having a tooth flank with a nominally involute surface and a root/fillet region with a trochoidal surface, the method comprising the steps of:

(a) rotatably supporting on first and second generally parallel spaced axes, first and second rolling dies, each having an outer peripheral contoured surface extending between generally parallel spaced lateral surfaces transverse to the first axis, each rolling die including a plurality of teeth, each tooth including a tooth flank with opposed involute surfaces and a tooth tip surface;

(b) rotatably supporting the powder metal workpiece on a third axis distant from and parallel to the first and second axes;

(c) advancing the first and second rolling dies, within a common plane generally containing the first, second, and third axes in respectively opposite in-feed directions generally perpendicular to the third axis until the rolling die meshingly engages with the workpiece, (d) rotating the rolling dies about their associated first and second axes while engaged with the workpiece;

(e) rolling the gear teeth surfaces of the workpiece to a substantially finished outer peripheral profiled gear tooth shape from tooth tip to tooth root on both sides of the gear teeth while engaged with the rolling die having an outer peripheral powder metal gear tooth finishing surface configured to geometrically finish the powder metal surface of each tooth, from tooth tip to tooth root on both sides of the gear tooth, during rolling so that the geometrically finished tooth, from tooth tip to tooth root on both sides of the gear tooth, has dimensional tolerances for power transmission gearing without subsequent grinding of the powder metal surface of the gear tooth, while holding the workpiece at the uniform metastable austenitic temperature, the powder metal gear teeth surfaces undergoing densification, plastic deformation, strengthening and final shaping as a result of the rolling and sliding operation;

(f) while performing step (d), maintaining continuous conjugacy between each of the rolling dies and the workpiece with the involute surface of each tooth of each of the rolling dies engaging the involute surface of a mating tooth of the workpiece and the tooth tip of each of the rolling dies engaging the trochoidal root/fillet surface between adjacent mating teeth of the workpiece;

(g) continuing to advance each of the rolling dies in the in-feed direction thereby deforming the surface of each tooth flank and of a corresponding root/fillet region until a final net shape of each tooth and of each root/fillet region is achieved, and (h) continuing to perform all of the preceding steps with the rolling dies and workpiece meshingly engaged, thereby deforming the involute and trochoidal root/fillet surfaces of all of the teeth of the workpiece resulting in a final net shaped machine element.

22. The method set forth in claim 21 wherein step (e) includes the steps of:

(i) radially compacting the material in the gear teeth surface layers resulting in a collapse of the pores initially existing in the gear teeth surface regions with resulting densification of the gear teeth surface regions; and (j) plastically deforming the gear teeth surface layers by causing lateral material flow of the gear teeth surface layers as a result of the operation of rolling and sliding in the metastable austenitic temperature range.

23. A method as set forth in claim 21 including the step, before step (c) of:

(i) advancing the workpiece in a through-feed direction parallel to the first, second, and third axes such that the outer peripheral profiled surface of the workpiece engages the outer peripheral profiled surface of each of the rolling dies and continues to advance until the workpiece is positioned substantially coextensive with the rolling dies in the through-feed direction.

24. A method as set forth in claim 22 wherein step (c) includes the steps of:

(i) simultaneously with step (h) after the workpiece and rolling die are substantially enmeshed, advancing the rolling die within a plane containing the first and second axes, in an in-feed direction substantially perpendicular to the first and second axes until the outer peripheral surface of the rolling die engages the outer peripheral surface of the workpiece at a near net shaped center distance establishing an initial center distance between the first and second axes when the workpiece and the rolling gear die are initially engaged; and (j) continuing to advance the workpiece in the in-feed direction by an additional increment of center distance thereby deforming the profile surfaces of each gear tooth resulting in final net shape of the teeth.

* * * * *

UNITED STATES PATENT AND TRADEMARK OFFICE
CERTIFICATE OF CORRECTION

PATENT NO. : 7,641,850 B2  Page 1 of 1
APPLICATION NO. : 10/802141
DATED : January 5, 2010
INVENTOR(S) : Nagesh Sonti et al.

It is certified that error appears in the above-identified patent and that said Letters Patent is hereby corrected as shown below:

Title page (12) Replace "Sontti" with --Sonti--

Title page (75) Replace "Nagesh Sontti" with --Nagesh Sonti--

Signed and Sealed this

First Day of June, 2010

David J. Kappos
*Director of the United States Patent and Trademark Office*